(12) United States Patent
Hubert et al.

(10) Patent No.: US 7,655,289 B2
(45) Date of Patent: Feb. 2, 2010

(54) OPTICAL FILM COMPOSITE HAVING SPATIALLY CONTROLLED ADHESIVE STRENGTH

(75) Inventors: Timothy J. Hubert, Hilton, NY (US); Alain E. Gros, Rochester, NY (US); Ralph Peter Schultz, Pittsford, NY (US); Yongcai Wang, Webster, NY (US); Herong Lei, Webster, NY (US); Wen-Li A. Chen, Rochester, NY (US); Charles Chester Anderson, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 415 days.

(21) Appl. No.: 11/299,606

(22) Filed: Dec. 12, 2005

(65) Prior Publication Data

US 2007/0134459 A1    Jun. 14, 2007

(51) Int. Cl.
*B32B 9/00* (2006.01)
*B32B 33/00* (2006.01)
*B32B 23/02* (2006.01)

(52) U.S. Cl. ............... 428/40.1; 428/41.9; 428/192; 428/194; 428/906

(58) Field of Classification Search ............ 428/40.1, 428/41.9, 192, 194, 906
See application file for complete search history.

(56) References Cited

U.S. PATENT DOCUMENTS

| 2,362,580 | A | 11/1944 | Nadeau et al. |
|---|---|---|---|
| 4,895,769 | A | 1/1990 | Land et al. |
| 5,256,357 | A | 10/1993 | Hayward |
| 5,695,694 | A | 12/1997 | Iwata et al. |
| 5,925,289 | A | 7/1999 | Cael et al. |
| 7,097,673 | B2 * | 8/2006 | Dudley et al. ............ 29/623.5 |
| 7,253,087 | B2 * | 8/2007 | Utsunomiya ............ 438/598 |
| 2003/0214715 | A1 | 11/2003 | Bermel |
| 2003/0215581 | A1 | 11/2003 | Bermel |
| 2003/0215582 | A1 | 11/2003 | Bermel |
| 2003/0215583 | A1 | 11/2003 | Bermel |
| 2003/0215608 | A1 | 11/2003 | Bermel |
| 2003/0215621 | A1 | 11/2003 | Bermel |
| 2003/0215658 | A1 | 11/2003 | Bermel |
| 2006/0262401 | A1 * | 11/2006 | Takahashi et al. ........... 359/494 |

FOREIGN PATENT DOCUMENTS

| JP | 94094915 | 4/1994 |
|---|---|---|
| JP | 11254550 A * | 9/1999 |

OTHER PUBLICATIONS

U.S. Appl. No. 10/838,681, filed May 4, 2002, entitled "Guarded Cover Film for LCD Polarizers".
U.S. Appl. No. 10/838,841, filed May 4, 2002, entitled "Polarizer Guarded Cover Sheet With Adhesion Promoter".

* cited by examiner

Primary Examiner—Patricia L Nordmeyer
(74) Attorney, Agent, or Firm—Nelson Adrian Blish

(57) ABSTRACT

The present invention generally relates to optical films useful in the manufacture of polarizer plates, an improved method for producing polarizing plates, and a Liquid Crystal Display employing the same. More particularly, the invention relates to an optical film composite comprising a temporary carrier substrate having a center area and an edge area, said substrate having coated thereon an optical film wherein the adhesive strength between the optical film and the substrate is greater at the edge area than at the center area of the substrate.

43 Claims, 11 Drawing Sheets

OPTICAL FILM COMPOSITE HAVING SPATIALLY CONTROLLED ADHESIVE STRENGTH

FIELD OF THE INVENTION

The present invention generally relates to optical films useful in the manufacture of polarizer plates, an improved method for producing polarizing plates, and a Liquid Crystal Display employing the same. It particularly relates to protective cover sheets for use with polarizer plates.

BACKGROUND OF THE INVENTION

Transparent resin films are used in a variety of optical and display applications. In particular, resin films are used as protective cover sheets for light polarizers in a variety of electronic displays, particularly Liquid Crystal Displays (LCD).

LCDs contain a number of optical elements that may be formed from resin films. The structure of reflective LCD's may include a liquid crystal cell, one or more polarizer plates, and one or more light management films. Liquid crystal cells are formed by dispersing liquid crystals such as twisted nematic (TN) or super twisted nematic (STN) materials between two electrode substrates. Polarizer plates are typically a multi-layer element of resin films and are comprised of a polarizing film sandwiched between two protective cover sheets. Polarizing films are normally prepared from a transparent and highly uniform amorphous resin film that is subsequently stretched to orient the polymer molecules and stained with a dye to produce a dichroic film. An example of a suitable resin for the formation of polarizer films is fully hydrolyzed polyvinyl alcohol (PVA). Because the stretched PVA films used to form polarizers are very fragile and dimensionally unstable, protective cover sheets are normally laminated to both sides of the PVA film to offer both support and abrasion resistance. Protective cover sheets of polarizer plates are required to have high uniformity, good dimensional and chemical stability, and high transparency. Originally, protective cover sheets were formed from glass, but a number of resin films are now used to produce lightweight and flexible polarizers. Although many resins have been suggested for use in protective cover sheets including, cellulosics, acrylics, cyclic olefin polymers, polycarbonates, and sulfones, acetyl cellulose polymers are most commonly used in protective cover sheets for polarizer plates. Polymers of the acetyl cellulose type are commercially available in a variety of molecular weights as well as the degree of acyl substitution of the hydroxyl groups on the cellulose backbone. Of these, the fully substituted polymer, triacetyl cellulose (TAC) is commonly used to manufacture resin films for use in protective cover sheets for polarizer plates.

The cover sheet normally requires a surface treatment to insure good adhesion to the PVA dichroic film. When TAC is used as the protective cover film of a polarizer plate, the TAC film is subjected to treatment in an alkali bath to saponify the TAC surface to provide suitable adhesion to the PVA dichroic film. The alkali treatment uses an aqueous solution containing a hydroxide of an alkali metal, such as sodium hydroxide or potassium hydroxide. After alkali treatment, the cellulose acetate film is typically washed with weak acid solution followed by rinsing with water and drying. This saponification process is both messy and time consuming. U.S. Pat. No. 2,362,580 describes a laminar structure wherein two cellulose ester films each having a surface layer containing cellulose nitrate and a modified PVA is adhered to both sides of a PVA film. JP 06094915A discloses a protective film for polarizer plates wherein the protective film has a hydrophilic layer which provides adhesion to PVA film.

Some LCD devices may contain a protective cover sheet that also serves as a compensation film to improve the viewing angle of an image. Compensation films (i.e. retardation films or phase difference films) are normally prepared from amorphous films that have a controlled level of birefringence either by uniaxial stretching or by coating with discotic dyes. Suitable resins suggested for formation of compensation films by stretching include polyvinyl alcohols, polycarbonates and sulfones. Compensation films prepared by treatment with dyes normally require highly transparent films having low birefringence such as TAC and cyclic olefin polymers.

Protective cover sheets may require the application of other functional layers (herein also referred to as auxiliary layers) such as an abrasion resistant hardcoat layer, antiglare layer, antireflection layer, anti-smudge layer, tie layer, barrier layer, or antistatic layer. Generally, these functional layers are applied in a process step that is separate from the manufacture of the resin film.

In general, resin films are prepared either by melt extrusion methods or by casting methods. Melt extrusion methods involve heating the resin until molten (approximate viscosity on the order of 100,000 cp), and then applying the hot molten polymer to a highly polished metal band or drum with an extrusion die, cooling the film, and finally peeling the film from the metal support. For many reasons, however, films prepared by melt extrusion are generally not suitable for optical applications. Principal among these is the fact that melt extruded films exhibit a high degree of optical birefringence. In the case of highly substituted cellulose acetate, there is the additional problem of melting the polymer. Cellulose triacetate has a very high melting temperature of 270-300° C., and this is above the temperature where decomposition begins. For these reasons, melt extrusion methods are generally not practical for fabricating many resin films including cellulose triacetate films used to prepare protective covers and substrates in electronic displays. Rather, casting methods are generally used to manufacture these films.

Resin films for optical applications are manufactured almost exclusively by casting methods, see for example U.S. Pat. No. 4,895,769 to Land and U.S. Pat. No. 5,925,289 to Cael. Casting methods involve first dissolving the polymer in an appropriate solvent to form a dope having a high viscosity on the order of 50,000 cp, and then applying the viscous dope to a continuous highly polished metal band or drum through an extrusion die, partially drying the wet film, peeling the partially dried film from the metal support, and conveying the partially dried film through an oven to more completely remove solvent from the film. Cast films typically have a final dry thickness in the range of 40-200 microns. In general, thin films of less than 40 microns are very difficult to produce by casting methods due to the fragility of wet film during the peeling and drying processes. Films having a thickness of greater than 200 microns are also problematic to manufacture due to difficulties associated with the removal of solvent in the final drying step. Although the dissolution and drying steps of the casting method add complexity and expense, cast films generally have better optical properties when compared to films prepared by melt extrusion methods, and problems associated with decomposition at high temperature are avoided.

Birefringence in cast or coated films arises from orientation of polymers during the manufacturing operations. This molecular orientation causes indices of refraction within the plane of the film to be measurably different. In-plane birefringence is the difference between these indices of refraction in perpendicular directions within the plane of the film. The absolute value of birefringence multiplied by the film thickness is defined as in-plane retardation. Therefore, in-plane retardation is a measure of molecular anisotropy within the plane of the film.

During a casting process, molecular orientation may arise from a number of sources including shear of the dope in the die, shear of the dope by the metal support during application, shear of the partially dried film during the peeling step, and shear of the free-standing film during conveyance through the final drying step. These shear forces orient the polymer molecules and ultimately give rise to undesirably high birefringence or retardation values. To minimize shear and obtain the lowest birefringence films, casting processes are typically operated at very low line speeds of 1-15 m/min as disclosed in U.S. Pat. No. 5,695,694 to Iwata. Slower line speeds generally produce the highest quality films.

Another drawback to the casting method is the inability to accurately apply multiple layers. As noted in U.S. Pat. No. 5,256,357 to Hayward, conventional multi-slot casting dies create unacceptably non-uniform films. In particular, line and streak non-uniformity is greater than 5% with prior art devices. Acceptable two layer films may be prepared by employing special die lip designs as taught in U.S. Pat. No. 5,256,357 to Hayward, but the die designs are complex and may be impractical for applying more than two layers simultaneously.

Another drawback to the casting method is the restrictions on the viscosity of the dope. In casting practice, the viscosity of dope is on the order of 50,000 cp. For example, U.S. Pat. No. 5,256,357 to Hayward describes practical casting examples using dopes with a viscosity of 100,000 cp. In general, cast films prepared with lower viscosity dopes are known to produce non-uniform films as noted for example in U.S. Pat. No. 5,695,694 to Iwata. In U.S. Pat. No. 5,695,694 to Iwata, the lowest viscosity dopes used to prepare casting samples are approximately 10,000 cp. At these high viscosity values, however, casting dopes are difficult to filter and degas. While fibers and larger debris may be removed, softer materials such as polymer slugs are more difficult to filter at the high pressures found in dope delivery systems. Particulate and bubble artifacts create conspicuous inclusion defects as well as streaks and may create substantial waste.

In addition, the casting method can be relatively inflexible with respect to product changes. Because casting requires high viscosity dopes, changing product formulations requires extensive down time for cleaning delivery systems to eliminate the possibility of contamination. Particularly problematic are formulation changes involving incompatible polymers and solvents. In fact, formulation changes are so time consuming and expensive with the casting method that most production machines are dedicated exclusively to producing only one film type.

More recently, commonly-assigned U.S. Patent Application Publications 2003/0215658A, 2003/0215621A, 2003/0215608A, 2003/0215583A, 2003/0215582A, 2003/0215581A, 2003/0214715A and U.S. patent application Ser Nos. 10/838,681 and 10/838,841 filed May 4, 2004 describe peelable resin films that are applied by coating onto a temporary carrier substrate using lower viscosity polymer solutions than are normally used to prepare cast films. The adhesion of the peelable resin film to the discontinuous, temporary carrier substrate must be carefully designed. If the peelable film is only weakly adhered to the carrier substrate, the film may be prone to premature delamination from the carrier substrate during its manufacture or during subsequent coating steps. This may thus result in a reduction in the efficiency of the manufacturing/coating facility. Premature release during manufacture can be avoided by making the peelable film strongly adherent to the carrier substrate, but at the cost of poor peeling of the releasable film from the carrier substrate by the end user.

What is needed is an improved optical film composite that reduces the risk of premature delamination of the optical film during manufacture of the composite while allowing easy peeling of the optical film during customer use.

SUMMARY OF THE INVENTION

This invention provides an optical film composite comprising a temporary carrier substrate having a center area and an edge area, said substrate having coated thereon an optical film wherein the adhesive strength between the optical film and the substrate is greater at the edge area than at the center area of the substrate. This invention further provides a method of manufacturing an optical film composite comprising a temporary carrier substrate having a center area and an edge area, and an optical film comprising a low birefringence polymer film, wherein the adhesive strength between the optical film and the substrate will be greater at the edge areas than at the center area of the substrate, said method comprising providing a precursor substrate; forming an edge area and a center area on the precursor substrate to provide a temporary carrier substrate wherein the center area has a different adhesive property than the edge area; and coating and drying at least a low birefringence polymer composition on the substrate to form the optical film. It also provides a method of providing an optical film comprising taking an optical film composite comprising a temporary carrier substrate and an optical film having a center area and an edge area wherein the adhesive strength between the optical film and the substrate will be greater at the edge areas than at the center area of the substrate; and removing the edge area. In one embodiment the optical film is coated on both sides of the substrate and is manufactured by providing a precursor substrate; forming an edge area and a center area on the precursor substrate on both side of the substrate to provide a temporary carrier substrate wherein the center area has a different adhesive property than the edge area; and coating and drying at least a low birefringence polymer composition on both sides of the substrate to form the optical film. The optical film may be the same or different when coated on both sides of the temporary carrier. It may also comprise various auxiliary layers.

This invention overcomes the limitations of prior art optical films prepared by conventional casting methods and provides an improved optical film composite that is thinner and has improved handling and processing during the steps necessary for the fabrication of Liquid Crystal Displays. It also provides an improved optical film composite comprising an adhesive layer that promotes adhesion to PVA dichroic films that eliminates the need for complex surface treatments such as saponification prior to the fabrication of polarizer plates used in Liquid Crystal Displays. The invention also provides an improved optical film composite that reduces the risk of premature delamination of the optical film during manufacture of the composite while allowing easy peeling of the optical film during customer use. The cover sheet is less susceptible to physical damage such as scratch and abrasion and is more dimensionally stable during its manufacture, storage and final handling steps necessary in the fabrication of Liquid Crystal Displays. In addition, the optical film composite of the invention is less susceptible to defects due to dirt and abrasion during the manufacture of the optical film and polarizer plates.

DETAILED DESCRIPTION OF THE INVENTION

Figure 1:
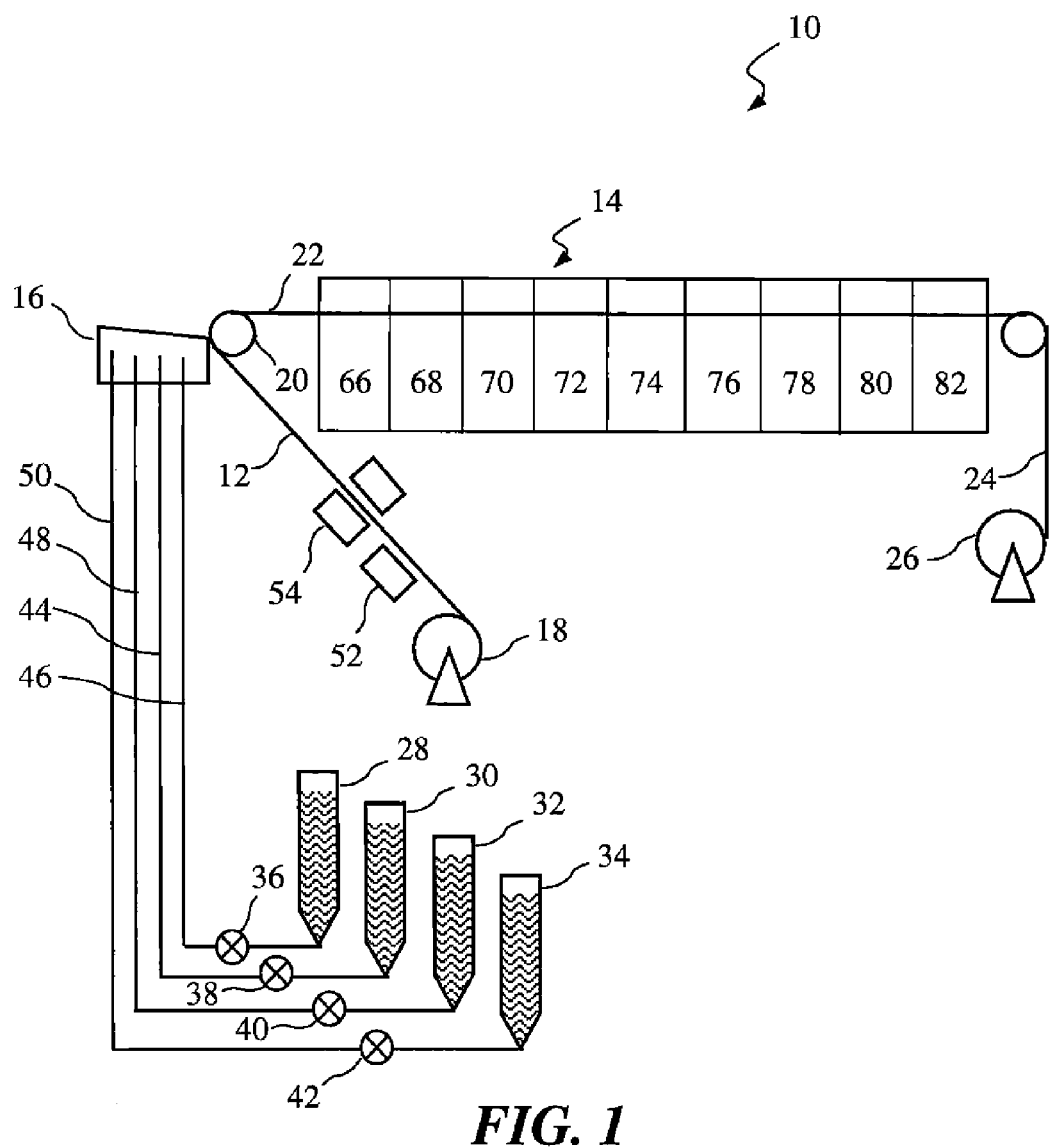
FIG. 1 is a schematic of an exemplary coating and drying apparatus that can be used in the practice of the method of the present invention.

The following definitions apply to the description herein:

An optical film composite refers to a low birefringence polymer film and optional auxiliary layers that have been applied onto a temporary carrier substrate. Abrasion resistant hard coat layers, antiglare layers, antireflection layers, low reflection layers, anti-smudge layers, antistatic layers, barrier layers, tie layers, and compensation layers are conventionally employed auxiliary layers.

A temporary carrier substrate is a polymeric, paper, resin-coated paper, metal or other flexible substrate that is supplied in roll form and coated with the optical film solution. After drying, the optical film is releasably adhered to the temporary carrier substrate so that the optical film may be easily removed (peeled) prior to its use in the fabrication of a Liquid Crystal Display. After peeling the optical film the carrier substrate may be discarded, recycled or reused.

A precursor substrate is a polymeric, paper, resin-coated paper, metal or other flexible substrate that is supplied in roll form and has not yet been surface treated or coated on the side of the substrate that will be coated with an optical film.

The optical film may comprise a peelable layer that serves to reduce the adhesive strength between the optical film and the carrier substrate, wherein the peelable layer remains as part of the optical film after separation (peeling) of the optical film from the substrate.

The carrier substrate may comprise a release layer that serves to reduce the adhesive strength between the optical film and the carrier substrate, wherein, the release layer remains as part of the carrier substrate after separation (peeling) of the optical film from the substrate. The release layer is applied onto the precursor substrate to form the carrier substrate.

The carrier substrate may also comprise a subbing layer that serves to increase the adhesive strength between the optical film and the carrier substrate. Areas of the support that contain a subbing layer have sufficiently strong adhesive strength between the optical film and the carrier substrate that the optical film applied in these areas is not peelable. The subbing layer is applied onto the precursor substrate to form the carrier substrate.

Adhesive strength ($S_A$) is calculated from the peel force ($F_p$), the angle of peel ($\theta$), and the width of a peeled sample (w) using the equation:

$$S_A = F_p(1-\cos\theta)/w$$

Cover sheets employed in Liquid Crystal Displays are optical films that comprise polymer films having low optical birefringence that are employed on each side of a dichroic film in order to maintain the dimensional stability of the dichroic film and to protect it from moisture and UV degradation.

Acid number for a polymer is defined as the number of milligrams of KOH required to neutralize 1 gram of polymer solids.

In-plane phase retardation, $R_{in}$, of a layer is a quantity defined by $(n_x-n_y)d$, where $n_x$ and $n_y$ are indices of refraction in the direction of x and y. x is taken as a direction of maximum index of refraction in the x-y plane and the y direction is perpendicular to it. The x-y plane is parallel to the surface plane of the layer. d is a thickness of the layer in the z-direction. The quantity $(n_x-n_y)$ is referred to as in-plane birefringence, $\Delta n_{in}$. The value of $\Delta n_{in}$ is given at a wavelength $\lambda=550$ nm.

Out of-plane phase retardation, $R_{th}$, of a layer is a quantity defined by $[n_z-(n_x+n_y)/2]d$. $n_z$ is the index of refraction in the z-direction. The quantity $[n_z-(n_x+n_y)/2]$ is referred to as out-of-plane birefringence, $\Delta n_{th}$. If $n_z>(n_x+n_y)/2$, $\Delta n_{th}$ is positive (positive birefringence), thus the corresponding $R_{th}$ is also positive. If $n_z<(n_x+n_y)/2$, $\Delta n_{th}$ is negative (negative birefringence) and $R_{th}$ is also negative. The value of $\Delta n_{th}$ is given at $\lambda=550$ nm.

Intrinsic Birefringence $\Delta n_{int}$ of a polymer refers to the quantity defined by $(n_e-n_o)$, where $n_e$, and $n_o$ are the extraordinary and the ordinary index of the polymer, respectively.

The actual birefringence (in-plane $\Delta n_{in}$ or out-of-plane $\Delta n_{th}$) of a polymer layer depends on the process of forming it, thus the parameter $\Delta n_{int}$.

Amorphous means a lack of long-range order. Thus an amorphous polymer does not show long-range order as measured by techniques such as X-ray diffraction.

Transmission is a quantity to measure the optical transmissivity. It is given by the percentile ratio of out coming light intensity $I_{out}$ to input light intensity $I_{in}$ as $I_{out}/I_{in} \times 100$.

Optic Axis refers to the direction in which propagating light does not see birefringence.

Uniaxial means that two of the three indices of refraction, nx, ny, and nz, are essentially the same.

Biaxial means that the three indices of refraction, nx, ny, and nz, are all different.

The present invention is directed to an improved optical film composite useful in the fabrication of Liquid Crystal Displays. In particular, the present invention provides an optical film composite comprising a temporary carrier substrate having a center area and edge area, said carrier substrate having coated thereon an optical film wherein the adhesive strength between the optical film and the carrier substrate is greater at the edge area than at the center area of the carrier substrate. The optical film comprises a low birefringence polymer film and, optionally, one or more auxiliary layers. Suitable auxiliary layers for use in the present invention include a abrasion resistant hardcoat layer, antiglare layer, anti-smudge layer or stain-resistant layer, antireflection layer, low reflection layer, antistatic layer, viewing angle compensation layer, and barrier layer. The present invention is also directed to an improved method of manufacturing the optical film composites of the invention and the use of these optical film composites in the fabrication of polarizer plates and Liquid Crystal Displays.

Turning now to FIG. 1 there is shown a schematic of an exemplary and well-known coating and drying system 10 suitable for preparing the optical film composites of the present invention. The coating and drying system 10 is typically used to apply very thin films to a moving carrier substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated substrate 22 then proceeds through the dryer 14. In the practice of the present invention the final optical film composite 24 comprising an optical film on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying system 10 may also include electrical discharge devices, such as corona or glow discharge device 52, or polar charge assist device 54, to modify the substrate 12 prior to application of the coating.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as slot die bead hopper or jet hopper. In a preferred embodiment of the present invention, the application device 16 is a multi-layer slide bead hopper.

As mentioned above, coating and drying system 10 includes a dryer 14 that will typically be a drying oven to remove solvent from the coated film. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 68-82 each has independent temperature and airflow controls. In each section, temperature may be adjusted between 5° C. and 150° C. To minimize drying defects from case hardening or skinning-over of the wet layers, optimal drying rates are needed in the early sections of dryer 14. There are a number of artifacts created when temperatures in the early drying zones are inappropriate. For example, fogging or blush of cellulose acetate films is observed when the temperature in zones 66, 68 and 70 are set at 25° C. This blush defect is particularly problematic when high vapor pressures solvents (methylene chloride and acetone) are used in the coating fluids. Aggressively high temperatures of 95° C. in the early drying sections 66, 68, and 70 are found to cause premature delamination of the cover sheet from the carrier substrate. Higher temperatures in the early drying sections are also associated with other artifacts such as case hardening, reticulation patterns and blistering of the cover sheet. In preferred embodiment of the present invention, the first drying section 66 is operated at a temperature of at least about 25° C. but less than 95° C. with no direct air impingement on the wet coating of the coated web 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may optimize empirically within these ranges by those skilled in the art.

Figure 2:
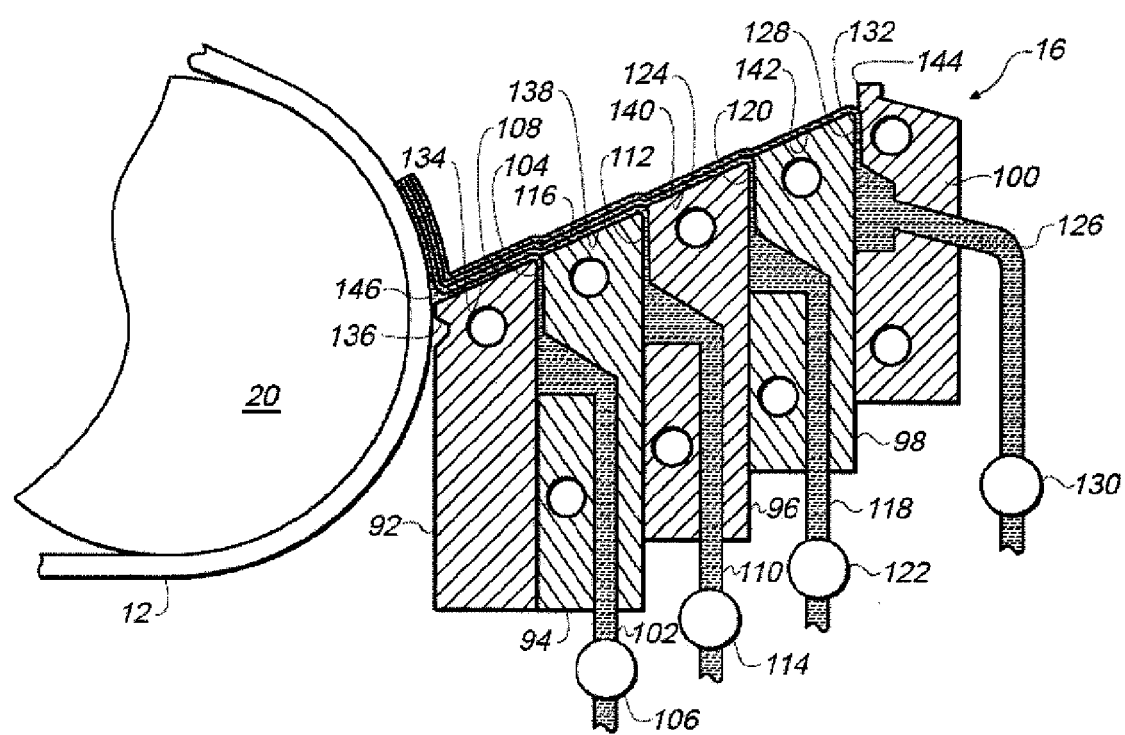
FIG. 2 is a schematic of an exemplary multi-slot coating apparatus that can be used in the practice of the present invention.

Referring now to FIG. 2, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20 about which a web 12 is conveyed. Coating layers 108, 116, 124, 132 form a multi-layer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method of the present invention.

For the purpose of the present invention, the coating fluids are comprised principally of a polymer binder dissolved in an organic solvent. In a particularly preferred embodiment, the low birefringence polymer film is a cellulose ester. These are commercially available in a variety of molecular weight sizes as well as in the type and degree of alkyl substitution of the hydroxyl groups on the cellulose backbone. Examples of cellulose esters include those having acetyl, propionyl and butyryl groups. Of particular interest is the family of cellulose esters with acetyl substitution known as cellulose acetate. Of these, the fully acetyl substituted cellulose having a combined acetic acid content of approximately 58.0-62.5% is known as triacetyl cellulose (TAC) and is generally preferred for preparing cover sheets used in electronic displays.

In terms of organic solvents for TAC, suitable solvents, for example, include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, TAC solutions are prepared with a blend of the aforementioned solvents. Preferred primary solvents include methylene chloride, acetone, methyl acetate, and 1,3-dioxolane. Preferred co-solvents for use with the primary solvents include methanol, ethanol, n-butanol and water.

Coating formulations may also contain plasticizers. Appropriate plasticizers for TAC films include phthalate esters (dimethylphthalate, dimethoxyethyl phthalate, diethylphthalate, dibutylphthalate, dioctylphthalate, didecylphthalate and butyl octylphthalate), adipate esters (dioctyl adipate), and phosphate esters (tricresyl phosphate, biphenylyl diphenyl phosphate, cresyl diphenyl phosphate, octyl diphenyl phosphate, tributyl phosphate, and triphenyl phosphate), glycolic acid esters (triacetin, tributyrin, butyl phthalyl butyl glycolate, ethyl phthalyl ethyl glycolate, and methyl phthalyl ethyl glycolate. Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the method of the present invention, plasticizers are used to minimize blistering, curl and delamination of TAC films during the drying operation. In a preferred embodiment of the present invention, plasticizers are added to the coating fluid at a total concentration of up to 50% by weight relative to the concentration of polymer in order to mitigate defects in the final TAC film.

The coating formulation for the low birefringence polymer may also contain one or more UV absorbing compounds to provide UV filter element performance and/or act as UV stabilizers for the low birefringence polymer film. Ultraviolet absorbing compounds are generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts. Any of the various ultraviolet light absorbing compounds which have been described for use in various polymeric elements may be employed in the polymeric elements of the invention, such as hydroxyphenyl-s-triazine, hydroxyphenylbenzotriazole, formamidine, or benzophenone compounds. As described in copending, commonly assigned U.S. patent application Ser. No. 10/150,634, filed May 5, 2002, the use of dibenzoylmethane ultraviolet absorbing compounds in combination with a second UV absorbing compound such as those listed above have been found to be particularly advantageous with respect to providing both a sharp cut off in absorption between the UV and visible light spectral regions as well as increased protection across more of the UV spectrum. Additional possible UV absorbers which may be employed include salicylate compounds such as 4-t-butylphenylsalicylate; and [2,2'thiobis-(4-t-octylphenolate)]n-butylamine nickel(II). Most preferred are combinations of dibenzoylmethane compounds with hydroxyphenyl-s-triazine or hydroxyphenylbenzotriazole compounds.

Dibenzoylmethane compounds which may be employed include those of the formula (IV)

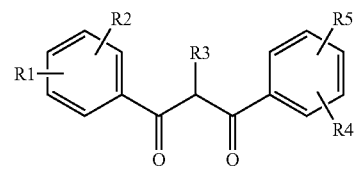

where R1 through R5 are each independently hydrogen, halogen, nitro, or hydroxyl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5-6 member heterocycle ring groups. Preferably, each of such groups comprises 20 or fewer carbon atoms. Further preferably, R1 through R5 of Formula IV are positioned in accordance with Formula IV-A:

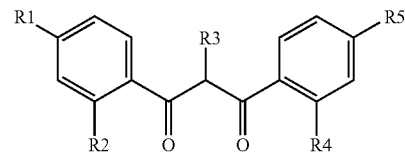

Particularly preferred are compounds of Formula IV-A where R1 and R5 represent alkyl or alkoxy groups of from 1-6 carbon atoms and R2 through R4 represent hydrogen atoms.

Representative compounds of Formula (IV) which may be employed in accordance the elements of the invention include the following:

(IV-1): 4-(1,1-dimethylethyl)-4'-methoxydibenzoylmethane (PARSOL® 1789) (IV-2): 4-isopropyl dibenzoylmethane (EUSOLEX® 8020) (IV-3): dibenzoylmethane (RHODIASTAB® 83)

Hydroxyphenyl-s-triazine compounds which may be used in the elements of the invention, e.g., may be a derivative of tris-aryl-s-triazine compounds as described in U.S. Pat. No. 4,619,956. Such compounds may be represented by Formula V:

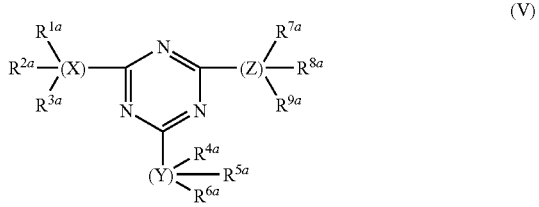

wherein X, Y and Z are each aromatic, carbocyclic radicals of less than three 6-membered rings, and at least one of X, Y and Z is substituted by a hydroxy group ortho to the point of attachment to the triazine ring; and each of $R^{1a}$ through $R^{9a}$ is selected from the group consisting of hydrogen, hydroxy, alkyl, alkoxy, sulfonic, carboxy, halo, haloalkyl and acylamino. Particularly preferred are hydroxyphenyl-s-triazines of the formula V-A:

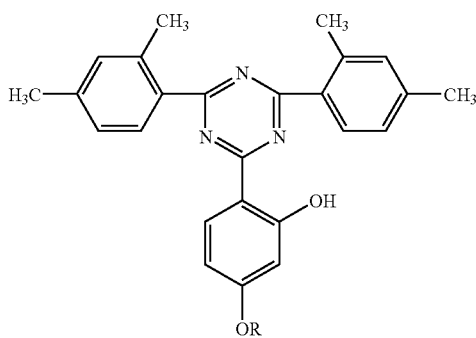

wherein R is hydrogen or alkyl of 1-18 carbon atoms.

Hydroxyphenylbenzotriazole compounds which may be used in the elements of the invention, e.g., may be a derivative of compounds represented by Formula VI:

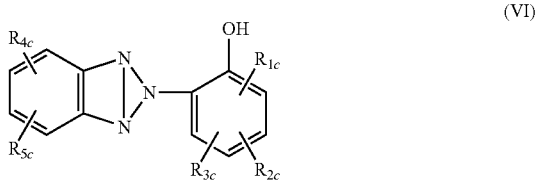

wherein $R_{1c}$ through $R_{5c}$ may be independently hydrogen, halogen, nitro, hydroxy, or further substituted or unsubstituted alkyl, alkenyl, aryl, alkoxy, acyloxy, aryloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl) benzotriazole; 2-(2'-hydroxy-5'-methylphenyl) benzotriazole; 2-(2'-hydroxy-3'-dodecyl-5'-methylphenyl) benzotriazole; and 2-(2'-hydroxy-3',5'-di-t-butylphenyl)-5-chlorobenzotriazole.

Formamidine compounds which may be used in the elements of the invention, e.g., may be a formamidine compound as described in U.S. Pat. No. 4,839,405. Such compounds may be represented by Formula VII or Formula VIII:

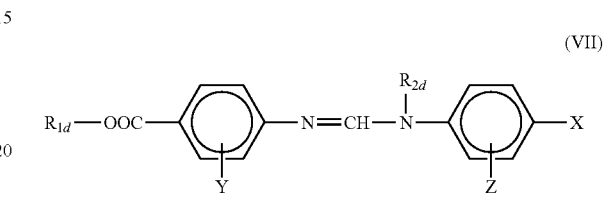

wherein $R_{1d}$ is an alkyl group containing 1 to about 5 carbon atoms; Y is a H, OH, Cl or an alkoxy group; $R_{2d}$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

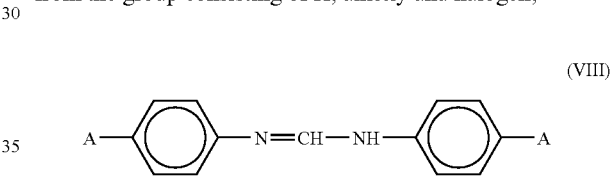

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene]amino]-ethyl ester.

Benzophenone compounds which may be used in the elements of the invention, e.g., may include 2,2'-dihydroxy-4,4'dimethoxybenzophenone, 2-hydroxy-4-methoxybenzophenone and 2-hydroxy-4-n-dodecyloxybenzophenone.

Coating formulations may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl)siloxanes such as DC510 Fluid from Dow Corning, and 3.) Polyalkyl substituted polydimethysiloxanes such as DC190 and DC1248 from Dow Corning as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FSO100) from Du Pont, 3.) Acrylate: polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multi-layer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small. In the method of the present invention, a practical surfactant concentration in the uppermost layer having a wet thickness of 20 µm and a density of 0.93 g/cc is 0.200% by weight which after drying gives a final surfactant amount of approximately 37 mg/sq-m.

Although surfactants are not required to practice the method of the current invention, surfactants do improve the uniformity of the coated film. In particular, mottle nonuniformities are reduced by the use of surfactants. In transparent cellulose acetate films, mottle nonuniformities are not readily visualized during casual inspection. To visualize mottle artifacts, organic dyes may be added to the uppermost layer to add color to the coated film. For these dyed films, nonuniformities are easy to see and quantify. In this way, effective surfactant types and levels may be selected for optimum film uniformity.

The preparation of the optical film composites of the present invention may also include the step of coating over a previously prepared composite of low birefringence polymer film and carrier substrate in order to prepare thicker low birefringence polymer films or to apply an auxiliary layer such as a abrasion resistant hard coat layer. For example, the coating and drying system 10 shown in FIGS. 1 and 2 may be used to apply a second multi-layer film to an existing low birefringence polymer film/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick films may be prepared at high line speeds without the problems associated with the removal of large amounts of solvent from a very thick wet film. Moreover, the practice of multi-pass or tandem coating also has the advantage of minimizing other artifacts such as streak severity, mottle severity, and overall film nonuniformity.

Figure 3:
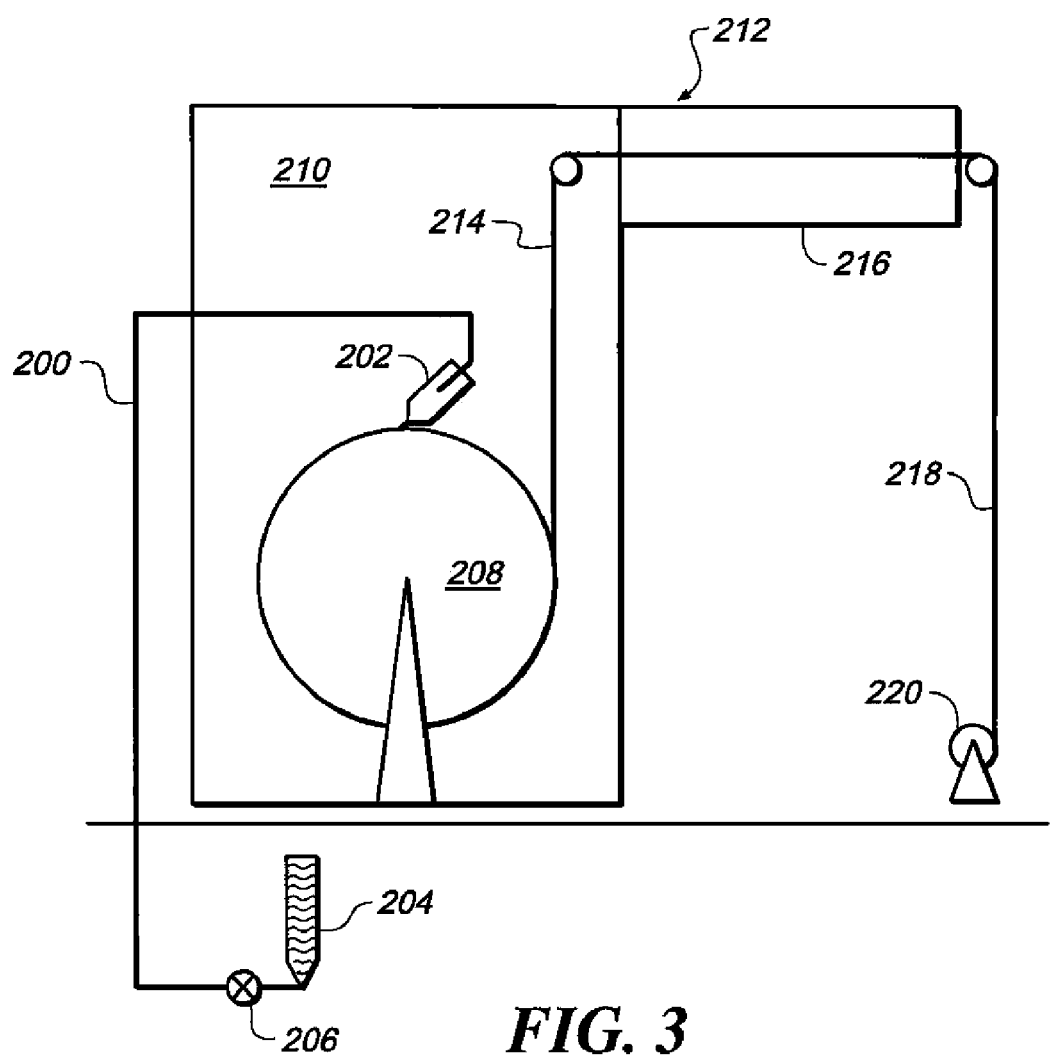
FIG. 3 is a schematic of a casting apparatus as used in prior art to cast cellulose acetate films.

The prior art method of casting resin films is illustrated in FIG. 3. As shown in FIG. 3, a viscous polymeric dope is delivered through a feed line 200 to an extrusion hopper 202 from a pressurized tank 204 by a pump 206. The dope is cast onto a highly polished metal drum 208 located within a first drying section 210 of the drying oven 212. The cast film 214 is allowed to partially dry on the moving drum 208 and is then peeled from the drum 208. The cast film 214 is then conveyed to a final drying section 216 to remove the remaining solvent. The final dried film 218 is then wound into rolls at a wind-up station 220. The prior art cast film typically has a thickness in the range of from 40 to 200 µm.

Coating methods are distinguished from casting methods by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the present invention the viscosity of the coated liquids will generally be less than 2000 cp and most often less than 1500 cp. Moreover, in the present invention the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping operation in casting methods. For example, n-butanol is sometimes used as a converting aid in casting TAC films to facilitate stripping of the TAC film from the metal drum. In terms of substrates, coating methods generally utilize thin (10-250 µm) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 3, respectively.

Figure 4:
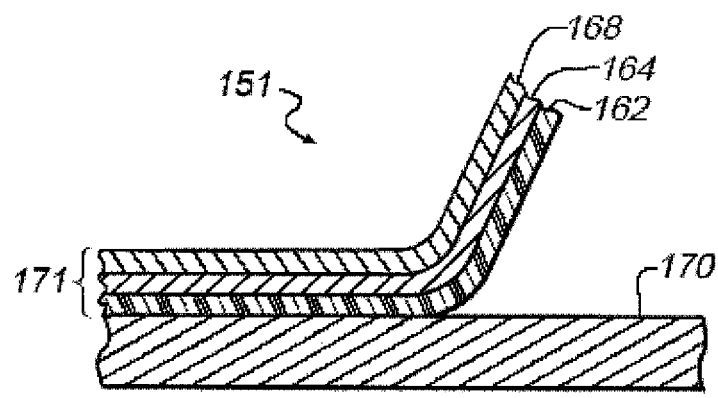
FIG. 4 shows a cross-sectional representation of an optical film composite of the invention comprising a three-layer optical film partially peeled from a carrier substrate wherein the optical film comprises a peelable layer.
Figure 5:
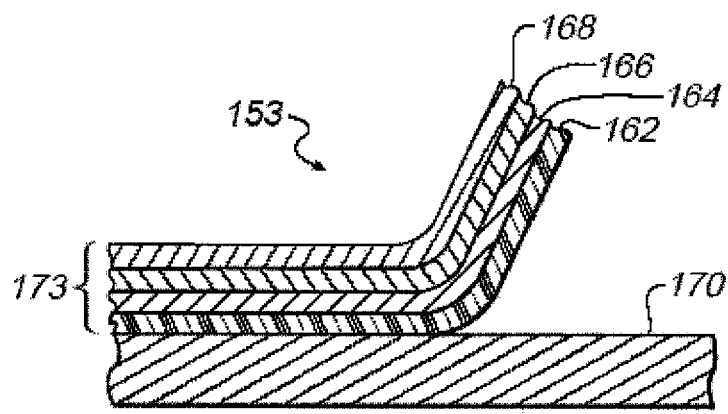
FIG. 5 shows a cross-sectional representation of an optical film composite of the invention comprising a four-layer optical film partially peeled from a carrier substrate wherein the optical film comprises a peelable layer.
Figure 6:
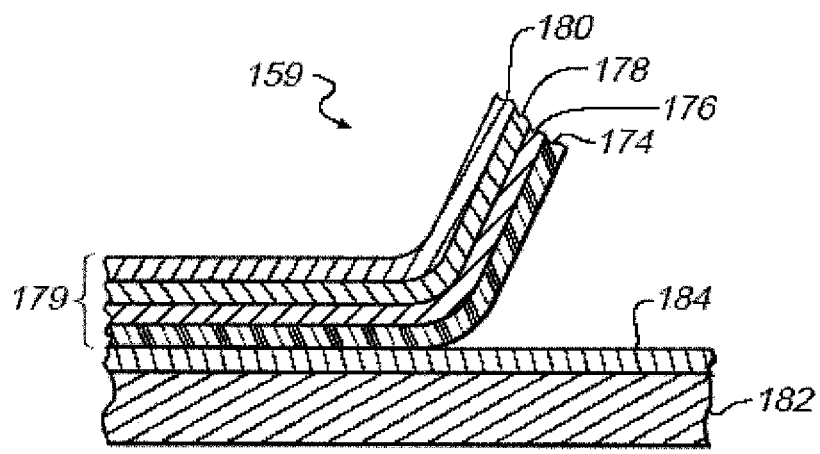
FIG. 6 shows a cross-sectional representation of an optical film composite of the invention comprising a four-layer optical film partially peeled from a carrier substrate wherein the carrier substrate comprises a release layer.

Turning next to FIGS. 4 through 6, there are presented cross-sectional illustrations showing various optical film composite configurations possible with the present invention. In FIG. 4, an optical film composite 151 comprising a three-layer optical film 171 having lowermost layer 162, intermediate layer 164, and outermost layer 168 is shown partially peeled from a carrier substrate 170. In this illustration, layer 162 could be a peelable layer, layer 164 could be a low birefringence polymer film, and layer 166 could be a viewing angle compensation layer, for example. Layers 162, 164, and 166 may be formed either by applying and drying three separate liquid layers on the carrier substrate 170 or by simultaneously applying a multiple layer composite coating and then drying the layers in a single drying operation.

FIG. 5 illustrates another optical film composite 153 comprising an optical film 173 that is comprised of, for example, four compositionally discrete layers including a lowermost layer 162 nearest to the carrier substrate 170, two intermediate layers 164 and 166, and an uppermost layer 168. FIG. 5 also shows that the entire multiple layer optical film 173 may be peeled from the carrier substrate 170. In this illustration, layer 162 could be a peelable layer, layer 164 could be a low birefringence polymer film, layer 166a could be an antistatic layer, and layer 168 could be an abrasion resistant hard coat layer, for example.

FIG. 6 illustrates a further optical film composite 159 comprising an optical film 179 that is comprised of, for example, four compositionally discrete layers including a lowermost layer 174 nearest to the carrier substrate 182, two intermediate layers 176 and 178, and an uppermost layer 180. The carrier substrate 182 comprises a release layer 184 to reduce the adhesion between the optical film lowermost layer 174 and carrier substrate 182.

FIGS. 4 through 6 serve to illustrate some of the optical film composites that may be constructed based on the detailed teachings provided hereinabove, they are not intended to be exhaustive of all possible variations of the invention. The optical film composites illustrated in FIGS. 4 through 6 are particularly useful as protective cover sheets for polarizer plates employed in LCDs. One skilled in the art could conceive of many other layer combinations that would be useful as optical film composites for use in the preparation of LCDs.

Figure 7:
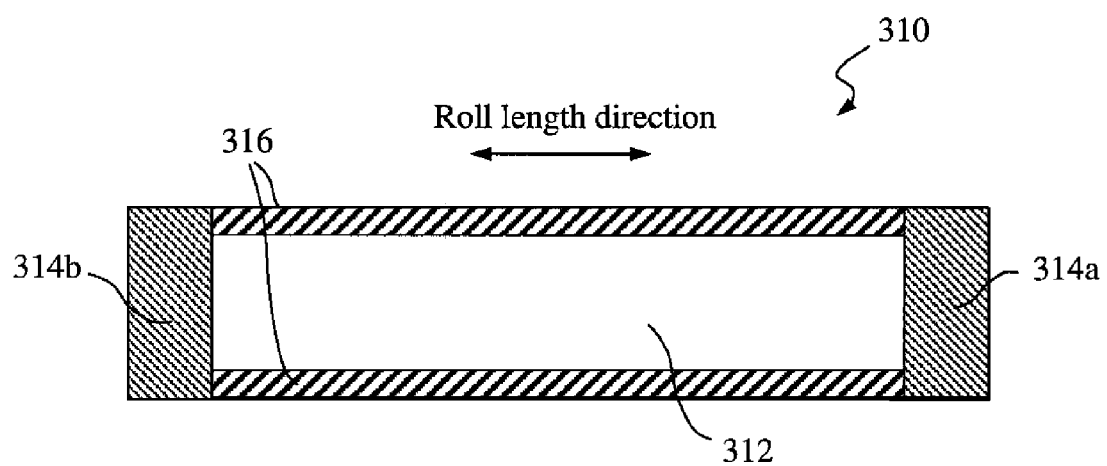
FIG. 7 shows a top plan view of a carrier substrate of the invention having a center area, edge area, a leading end area, and a trailing end area.

Turning now to FIG. 7 wherein a top plan view of a temporary carrier substrate 310 suitable for the purpose of the present invention having a center area 312, edge area 316, a leading end area 314a, and a trailing end area 314b is represented. The adhesive strength between the optical film and the carrier substrate 310 is greater at the edge area 316 than at the center area 312 of the carrier substrate. In another embodiment, the adhesive strength between the optical film and the carrier substrate 310 is also greater on the leading end area 314a and the trailing end area 314b. Providing an optical film composite having a greater adhesive strength at the edge area and, optionally the leading and trailing end areas, compared with the center of the carrier substrate reduces the risk of premature delamination of the optical film during manufacture of the composite while allowing easy peeling of the optical film during manufacture of a Liquid Crystal Display.

Excessive adhesion between the optical film and the center area of the carrier substrate is undesirable since the optical film may be damaged during peeling operations. The maximum adhesive strength that allows acceptable peel behavior without breaking the optical film is dependent on the thickness and tensile properties of the optical film. Typically, an adhesive strength between the optical film and the center area of the carrier substrate greater than about 10 N/m may result in poor peel behavior. Optical films peeled from such excessively well-adhered composites exhibit defects due to tearing of the optical film and/or due to cohesive failure within the optical film. In a preferred embodiment of the present invention, the adhesive strength between the optical film and the center area of the carrier substrate is less than 5 N/m. Most preferably, the adhesive strength is less than about 2 N/m.

During their manufacture, optical film composites may develop curl in the edge area of the composite as a result of coating and drying the optical film, this is especially true for thick optical films on thin carrier substrates. As the composite is conveyed over rollers in the coating and drying system the curled edges of the composite may flex up and down leading to delamination of the optical film in the edge areas. Delamination may then spread across the entire composite. Delamination during the manufacturing process can be prevented by increasing the adhesive strength of the optical film to the carrier substrate. However, as already mentioned excessive adhesion between the optical film and the carrier substrate is undesirable since the optical film may be damaged during subsequent peeling operations. In the present invention this apparent dilemma is overcome by providing an optical film composite wherein the adhesive strength between the optical film and the carrier substrate is greater at the edge area than at the center area of the carrier substrate. High adhesive strength at the edge area anchors the optical film to the carrier substrate during manufacture and then the edge area is removed by a trim or slitting operation prior to peeling the optical film from the center area of the carrier substrate.

In order to insure that the adhesive strength between the optical film and the carrier substrate in the edge area and, optionally the leading end and trailing end areas, is sufficiently strong to effectively anchor the optical film during the manufacturing process the adhesive strength in these areas should be at least a factor of 10 higher than in the center area. Preferably the adhesive strength should be a factor of 50 higher and most preferably a factor of 200 higher. Typically, the adhesive strength between the optical film and the carrier substrate in the edge area and the end areas is greater than 100 N/m and may even exceed the break strength of the optical film.

In order for the edge area to be effective, it should comprise at least about 0.5 percent of the total width of the carrier substrate. Preferably the edge area should be at least 1 percent of the total width of the carrier substrate, more preferably at least 2 percent. A narrower edge area does not provide enough area for the optical film to remain anchored to the carrier substrate during manufacture. On the other hand, an edge area greater than about 10 percent of the carrier substrate limits the useful width of the optical film.

In order to prevent delamination at the start and end of a roll of optical film composite during the manufacturing process, the optical film composite preferably comprises a carrier substrate having a leading end area and a trailing end area wherein the adhesive strength of the optical film to the carrier substrate at these end areas is higher than in the center area. The length of the leading end area and trailing end area necessary to reduce the likelihood for delamination is partly dependent on the manufacturing speed. For example, for a manufacturing speed of about 40 meters/min, a suitable length for the end areas is at least 2 meters, preferably at least 5 meters. Higher manufacturing speeds may require proportionately longer end areas. However, end areas that are longer than about 2 percent of the roll length limit the productivity of the manufacturing process.

In one embodiment of the invention a means for providing the desired adhesive strength at the edge area and also the leading and trailing end areas is by exposing these areas of the precursor substrate with a surface energy treatment to form the carrier substrate prior to applying the optical film coating solution. The surface energy treatment chemically modifies and/or roughens the surface of the precursor substrate in the treated areas so that the optical film interacts more strongly with or chemically bonds with the thus formed carrier substrate. Suitable surface energy treatment methods include corona discharge treatment, glow discharge treatment, plasma treatment, electron beam exposure, laser beam exposure, and others. Preferred surface energy treatments are corona discharge treatment and glow discharge treatment since these are most commonly employed in the coating industry.

In other embodiments of the invention a peelable layer or a release layer may be employed to reduce the adhesive strength between the optical film and the center area of the carrier substrate to improve the peeling of the optical film. The peelable layer or release layer preferably covers substantially all of the center area of the substrate.

Figure 8:
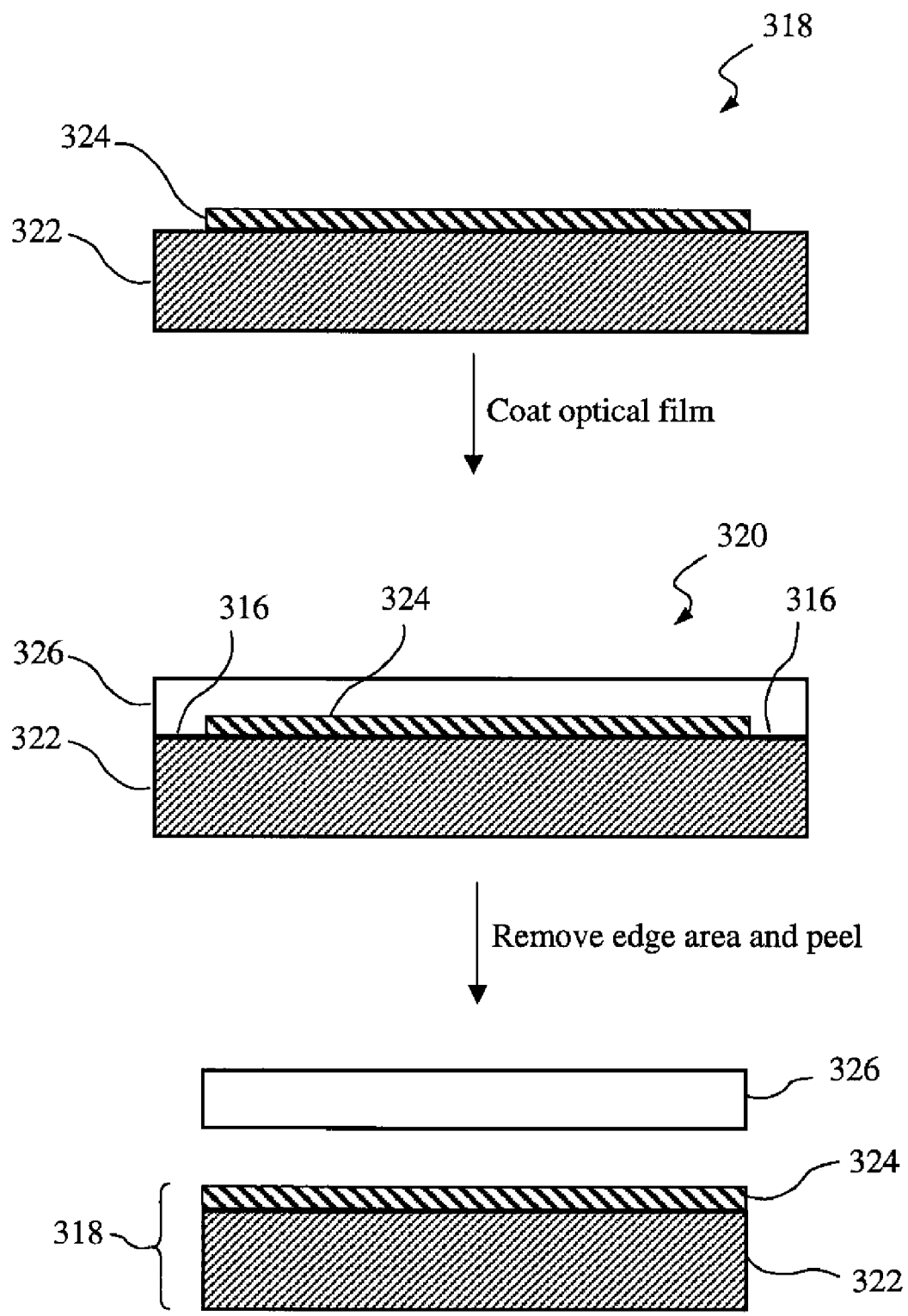
FIG. 8 shows a cross-sectional representation of an optical film composite of the invention comprising a carrier substrate having a center area and edge area and an optical film coated thereon, the carrier substrate comprising a release layer in the center area.

Referring now to FIG. 8 which shows a cross-sectional representation of an optical film composite of the invention having a carrier substrate 318 comprising a precursor substrate 322 and release layer 324 in the center area of the carrier substrate. Onto the carrier substrate 318 is coated an optical film 326 to form optical film composite 320 having an adhesive strength between the optical film and the carrier substrate that is greater at the edge area 316 than at the center area of the substrate. Prior to application of the optical film coating the carrier substrate 318 may be treated over its entire width or just in the edge area 316 with a surface energy treatment such as those treatments listed hereinabove. In a particularly preferred embodiment the carrier substrate 318 is treated with a corona discharge or glow discharge prior to application of the optical film coating. The release layer is generally made of a material which will not easily adhere to the optical film, or one that after a surface treatment does not adhere to the optical film.

After the optical film composite is manufactured but before the optical film is peeled the edge area is removed by a slitting operation to allow the optical film 326 to be easily peeled from the center area of the carrier substrate 318.

Figure 9:
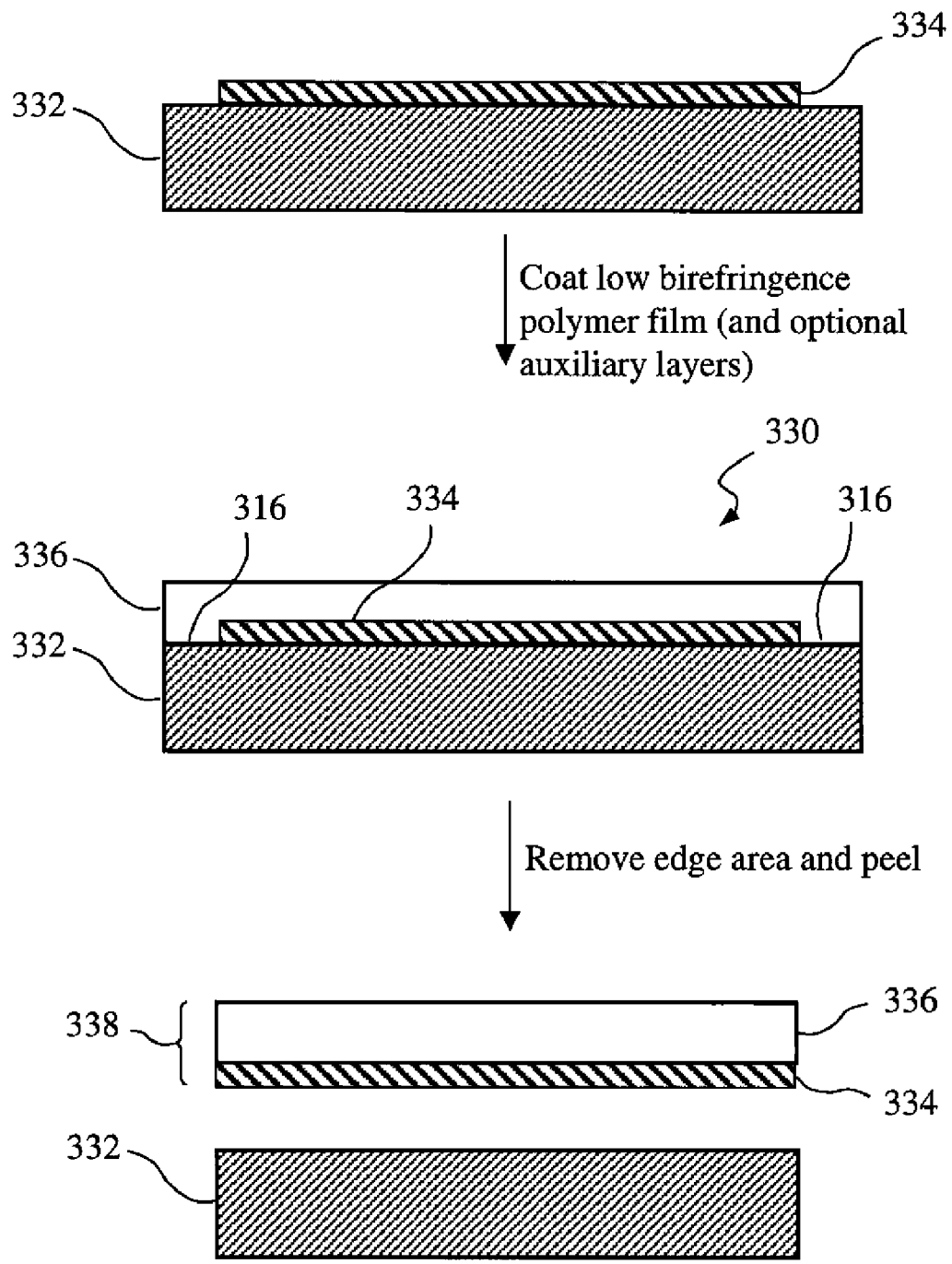
FIG. 9 shows a cross-sectional representation of an optical film composite of the invention comprising a carrier substrate having a center area and edge area and an optical film coated thereon, the optical film comprising a peelable layer in contact with the center area of the carrier substrate.

Referring now to FIG. 9 which shows a cross-sectional representation of an optical film composite of the invention having a carrier substrate 332 which is coated in the center area with a peelable layer 334 in a first coating and drying operation. A low birefringence polymer film 336 plus optional auxiliary layers (not shown) is coated onto the peelable layer 334 and edge area 316 to form optical film composite 330 having an adhesive strength between the optical film and the carrier substrate that is greater at the edge area 316 than at the center area of the substrate. At this point the peelable layer 334 is considered to be part of the optical film. Prior to application of the low birefringence polymer film coating, the peelable layer 334 and edge area 316 may be treated with a surface energy treatment such as those treatments listed hereinabove. In a particularly preferred embodiment the treatment is with a corona discharge or glow discharge prior to application of the low birefringence polymer film coating. The peelable layer is generally made of a material which will not easily adhere to the substrate, or one that after a surface treatment does not easily adhere to the substrate.

After the optical film composite is manufactured but before the optical film is peeled the edge area is removed by a slitting operation to allow the optical film 338 to be easily peeled from the center area of the substrate 332.

Figure 10:
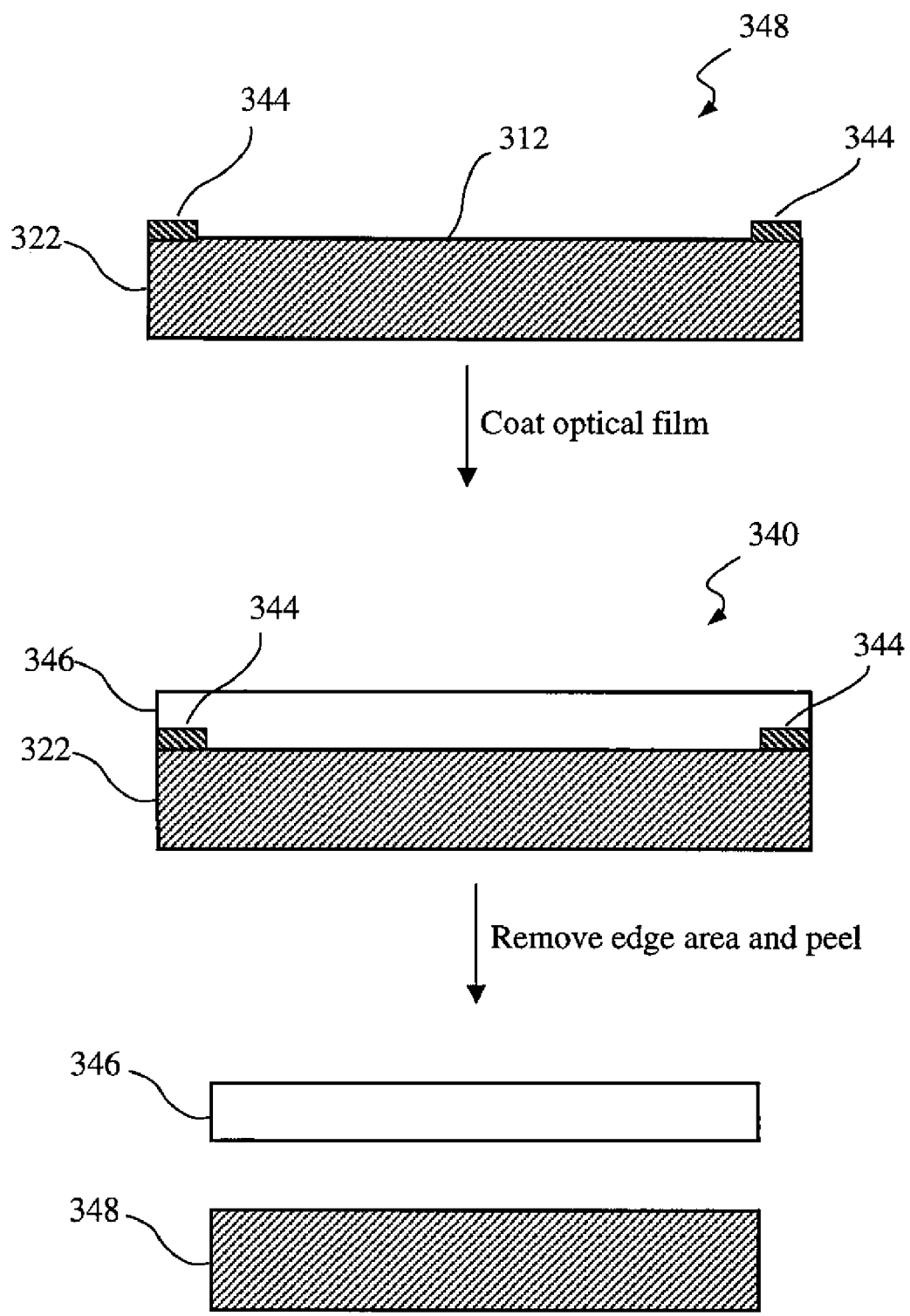
FIG. 10 shows a cross-sectional representation of an optical film composite of the invention comprising a carrier substrate having a center area and edge area and an optical film coated thereon, the carrier substrate comprising a subbing layer in the edge area.

Referring now to FIG. 10 which shows a cross-sectional representation of an optical film composite of the invention having a carrier substrate 348 comprising a precursor substrate 322 and subbing layer 344 in the edge area of the carrier substrate 348. Onto the carrier substrate 348 is coated an optical film 346 to form optical film composite 340 having an adhesive strength between the optical film and the carrier substrate that is greater at the edge area than at the center area 312 of the substrate. Prior to application of the optical film coating the carrier substrate 348 may be treated over its entire width or just in the edge area with a surface energy treatment such as those treatments listed hereinabove. In a particularly preferred embodiment the substrate 348 is treated with a corona discharge or glow discharge prior to application of the optical film coating. The subbing layer is generally made of a material that has a greater adherence to the optical film than the precursor substrate has to the optical film. This may be either before or after surface treatment.

After the optical film composite is manufactured but before the optical film is peeled the edge area is removed by a slitting operation to allow the optical film 346 to be easily peeled from the center area.

Figure 11:
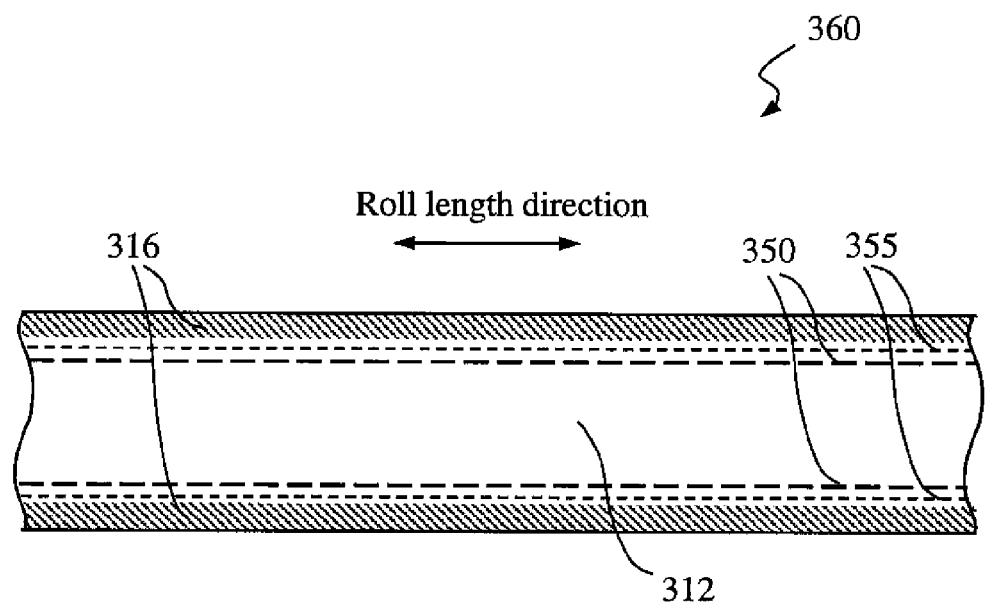
FIG. 11 shows a top plan view of an optical film composite of the invention illustrating the relative position of center area, edge area, and knurls prior to removal of the composite edges by a slitting operation.
Figure 12:
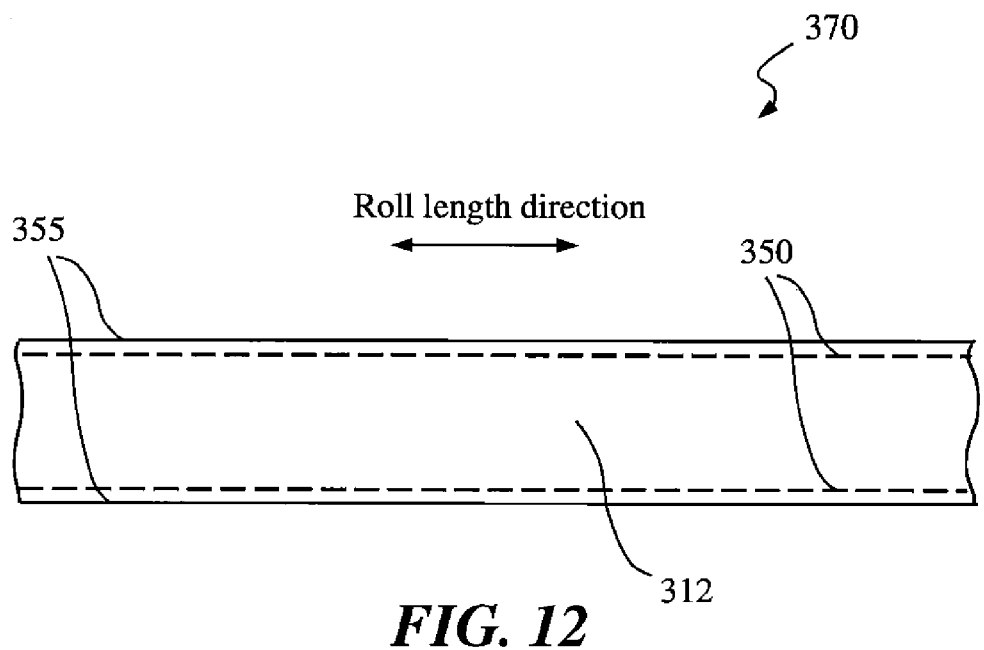
FIG. 12 shows a top plan view of an optical film composite of the invention after the composite edges have been removed by a slitting operation.

Turning now to FIG. 11 wherein a top plan view of an optical film composite 360 of the invention is shown in which a center area 312, edge area 316, and knurls 350 are represented relative to the location for edge slitting 355 prior to the edges of the composite being removed. In the embodiment illustrated the knurls 350 are located in-board (i.e., closer to the center of the composite) than the edge area 316. The location for edge slitting 355 is between knurls 355 and edge area 316. FIG. 12 shows a top plan view of the optical film of FIG. 11 after the edges have been removed by a slitting operation. It can be seen that after edge slitting the optical film composite 370 contains knurls 350 that assist in any subsequent winding and/or conveyance operations.

Typically, web products, including the optical film composites of the invention, may undergo a slitting operation to trim edges from the web. The web is cut by means of devices employing cooperating blades or knives that comprise, for example, a cutting shaft on which there are rotatably mounted one or more circular knives (or upper knives) that are designed to be brought near to, or even made to bear against, corresponding bedknives (or lower knives), that are also mounted on a shaft substantially parallel to the first. The product is cut by means of a shearing effect to which the web is subjected during its passage between the upper knives and the bedknives, which overlap over a part of their periphery. Such slitting operations are well known in the film, paper, and converting industry.

Precursor and carrier substrates suitable for the use in the present invention may comprise polyethylene terephthalate (PET), polyethylene naphthalate (PEN), polycarbonate, polystyrene, and other polymeric films. Additional substrates may include paper, laminates of paper and polymeric films, glass, cloth, aluminum and other metal supports. Preferably, the substrate is a polyester film comprising polyethylene terephthalate (PET) or polyethylene naphthalate (PEN). The thickness of the substrate is about 20 to 200 micrometers, typically about 40 to 100 micrometers. Thinner substrates are desirable due to both cost and the weight per roll of optical film composite. However, substrates less than about 20 micrometers may not provide sufficient dimensional stability or protection for the optical film.

Precursor and carrier substrates may have an antistatic layer containing various polymer binders and conductive addenda in order to control static charging and dirt and dust attraction. The antistatic layer is typically on the side of the precursor and carrier substrates opposite to the side that the optical film is applied.

On the side of the precursor and carrier substrates opposite to the side that the optical film is applied, a backing layer may also be employed in order to provide a surface having appropriate roughness and coefficient of friction for good winding and conveyance characteristics. In particular, the backing layer comprises a polymeric binder such as a polyurethane or acrylic polymer containing matting agent such a silica or polymeric beads. The matting agent helps to prevent the sticking of the front side of the optical film composite to the backside during shipping and storage. The backing layer may also comprise a lubricant to provide a coefficient of friction of about 0.2 to 0.4. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patents 1,263,722; 1,198,387; 1,430,997; 1,466,304; 1,320,757; 1,320,565; and 1,320,756; and in German Patents 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity a polymerizable lubricant such as Additive 31, a methacryloxy-functional silicone polyether copolymer (from Dow Corning Corp.) is preferred.

In a preferred embodiment of the invention, the precursor and carrier substrates comprise edge knurls to ensure good winding and conveyance characteristics during the manufacture, storage, and shipping of the optical film composite. During the manufacture of various types of web materials such as plastic films, longitudinally extending knurl patterns frequently are provided along the length of the web at one or both edges. Such knurl patterns are areas of the web near its edges where the web has been functionally thickened by mechanical embossing processes such as those disclosed in commonly-assigned U.S. Pat. Nos. 3,502,765; 5,393,589; and 5,670,188 which are incorporated herein by reference. An alternative process referred to induction heated knurling involves pressing together two knurling wheels, one or both of which are heated above the surrounding temperature. Heating of the wheels can be accomplished by electric coil, preheated oil, ultrasonic wave, or other means. One possible setup is to heat the wheel that has the teeth (i.e., up) features on the back side (i.e., the side opposite the side that the optical film will be coated) of the precursor substrate, and pressing it against the substrate, while the other side (front) of the substrate is supported by a smooth backing wheel which doesn't have any teeth features. In this setup, the teeth features on the wheel partially melts the substrates on back side, and thus creates down (divots) and up (rings) features on the back side. This setup enables the generation of knurl features on the back side only, and this is advantageous since it creates a single-sided knurl pattern that doesn't have any feature on the front side. Induction heated knurls have other advantages compared with mechanical knurls. Induction heated knurls can be made cleaner, and are typically more rigid and more resistant to crushing in a wound roll.

The use of knurl patterns at the edges of the substrate, hereinafter referred to as "edge knurls", reduces or eliminates several commonly recognized quality problems related to winding, including hard streaks caused by transverse variations in the thickness of the substrate which persist over a considerable length; pressure damage to coatings on the substrate due to contact between convolutions of the wound substrate, surface skidding of convolutions over one another due to air entrainment into the roll during winding; and core impressions due to the edge of the end of the substrate and any tape used to attach the substrate to the winding core. Knurls suitable for use in the present invention may be continuous or intermittent throughout the length of the roll. One side of the substrate may be embossed and the other side minimally embossed (referred to as "single-sided" knurls) or both sides of the substrate may be embossed (referred to as "double-sided' knurls). Preferably, the optical film composites of the invention comprise single-sided, intermittent knurls, wherein the optical film is applied onto the side of the carrier substrate that is minimally embossed. Suitable knurls for the purpose of the present invention have a width on each edge that are typically about 3 mm to 50 mm wide, preferably 6 to 25 mm wide, most preferably 10 to 13 mm wide. The knurl height is typically about 1 to 100 microns, preferably 2 to 50 microns, most preferably 5 to 30 microns.

Low birefringence polymer films suitable for use in the present invention comprise polymeric materials having low Intrinsic Birefringence $\Delta n_{int}$ that form high clarity films with high light transmission (i.e., >85%). Preferably, the low birefringence polymer film has in-plane birefringence, $\Delta_{in}$ of less than about $1\times10^{-4}$ and an out-of-plane birefringence, $\Delta n_{th}$ of from 0.005 to −0.005.

Exemplary polymeric materials for use in the low birefringence polymer films of the invention include cellulose esters (including triacetyl cellulose (TAC), cellulose diacetate, cellulose acetate butyrate, cellulose acetate propionate), polycarbonates (such as Lexan® available from General Electric Corp.), polysulfones (such as Udel® available from Amoco Performance Products Inc.), polyacrylates, and cyclic olefin polymers (such as Arton® available from JSR Corp., Zeonex® and Zeonor® available from Nippon Zeon, Topas® supplied by Ticona), among others. Preferably, the low birefringence polymer film of the invention comprises TAC, polycarbonate, or cyclic olefin polymers due their commercial availability and excellent optical properties.

The low birefringence polymer film has a thickness from about 5 to 100 micrometers, preferably from about 5 to 50 micrometers and most preferably from about 10 to 30 micrometers. Films having thickness of 10 to 40 micrometers are most preferred due to cost, handling, ability to provide thinner polarizer plates and displays, improved light transmission, and freedom from curl on the carrier substrate. Polarizer plates fabricated from conventional polarizer cover sheets comprising a low birefringence polymer film thickness of about 80 micrometers have a total thickness of at least 180 micrometers. In a preferred embodiment of the current invention, polarizer plates assembled from optical films of the invention that serve as polarizer cover sheets have a total thickness of less than 120 micrometers, and most preferably less than 80 micrometers.

Release layers may be comprised of a number of polymeric materials such as polyvinylbutyrals, cellulosics, polyacrylates, polycarbonates and poly(acrylonitrile-co-vinylidene chloride-co-acrylic acid). Other suitable release layers for the purpose of the present invention included silicone polymers. The silicone polymer release layer comprises an organic material having a Si—O bond in its structure. The flexibility inherent in the Si—O bond and their low surface energy are essential for the silicone's unique release properties. For the purpose of the present invention, the silicon layer preferably has a surface energy of 50 mN/m or less, more preferably 30 mN/m or less, and most preferably 25 mN/m or less, in order to insure facile transfer of the thin conductive layer. Preferably, the silicone layer comprises a silicone polymer. Most preferably, the silicone polymer is crosslinked (also referred to as "cured"). Crosslinking the silicone polymer helps to insure that the release layer is nonmigratory (that is, the release material is not transferred with the conductive layer, but rather remains permanently attached to the donor substrate).

Silicone release layers are well known in the field of pressure sensitive adhesive (PSA) coated materials including labels, tapes, sign lettering, floor tiles, etc. Typical silicone release materials that are suitable in the present invention contain dimethyl siloxane groups. Silicone release materials are cured either thermally or using UV or electron beam radiation. Thermal curing is often aided by the presence of a tin or platinum based catalyst. To reduce cure time, the silicone release layers may be coated from silicone modified with epoxy, acrylate, urethane, ester, or other functionality known in the art. Particularly suitable silicone materials are epoxy silanes such as those described in U.S. Pat. No. 5,370,981, because of their effectiveness in small quantity, as well as coatability, commercial availability, and compatibility with polymeric conductors. The silicone layer may be applied from water, solvent, or solvent-less formulations. A wide range of suitable silicone materials are commercially available from Dow Corning Corporation (Syl-Off® series), Rhodia Silicones (SILCOLEASE® series), General Electric Co. (GE Silicones), Genesee Polymers Corp. (EXP® series), Degussa Corp., and others.

Subbing layers may be comprised of a wide variety of polymeric materials such as polyacrylates, polyurethanes, polyesters, styrenic polymers, and the like. The subbing layer is selected to provide strong adhesion to both the precursor substrate and the optical film. In one embodiment of the invention, the precursor substrate comprises polyethylene terephthalate, the optical film comprises TAC, and a preferred subbing layer comprises vinylidene chloride, more specifically poly(acrylonitrile-co-vinylidene chloride-co-acrylic acid).

Peelable layers may be comprised of a wide variety of polymeric materials depending on the material that is employed for the carrier substrate. The choice of materials used in the peelable layer may be optimized empirically by those skilled in the art so that an adhesive strength between the optical film and the center area of the carrier substrate is less than 10 N/m.

In one embodiment of the invention, in which the carrier substrate comprises polyethylene terephthalate, suitable peelable layers comprise water-soluble, hydrophilic polymers which include both synthetic and natural polymers. Naturally occurring substances include proteins, protein derivatives, cellulose derivatives (e.g. cellulose esters), polysaccharides, casein, and the like, and synthetic polymers include poly(vinyl lactams), acrylamide polymers, polyvinyl alcohol and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like. The most preferred polymers are polyvinyl alcohol and its derivatives. A peelable layer comprising polyvinyl alcohol may also function as an adhesive layer that promotes adhesion to PVA dichroic films that serve as polarizing films for LCDs.

Other suitable polymers useful in the peelable layer include water dispersible polymers or polymer latexes. Preferably these water dispersible polymers contain at least one hydrophilic moiety, which includes hydroxyl, carboxyl, amino, or sulfonyl moieties. Such polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other suitable polymer dispersions are polyurethane dispersions or polyesterionomer dispersions, polyurethane/vinyl polymer dispersions, fluoropolymer dispersions. These polymer dispersions have a particle size in the range of from 10 nanometers to 1 micron.

The peelable layer may also be an optically clear, pressure sensitive adhesive layer. A wide variety of these pressure sensitive adhesives are available. Adhesive materials useful for laminating the cover sheet to the PVA dichroic film can be selected from the general class of "modified acrylics" that have good adhesion, are transparent, and are inert with respect to chemical and UV aging and yellowing. High strength adhesives useful in this invention, for example, are aqueous-based adhesives such as Aeroset® 2177 or Aeroset®t 2550, 3240, and 3250 which are commercially available from Ashland Chemical Co., PD 0681, AP 6903, and W 3320 available from H. B. Fuller, or solvent-based pressure sensitive adhesives such as PS 508 sold by Ashland Chemical Co. The adhesives may be used separately or in combination.

The peelable layer may also contain a crosslinking agent. Crosslinking agents useful for the practice of the invention include any compounds that are capable of reacting with the hydrophilic moieties attached to the polymer binder. Such crosslinking agents include aldehydes and related compounds, pyridiniums, olefins such as bis(vinylsulfonyl methyl) ether, carbodiimides, epoxides, triazines, polyfunctional aziridines, methoxyalkyl melamines, polyisocyanates, and the like. These compounds can be readily prepared using the published synthetic procedure or routine modifications that would be readily apparent to one skilled in the art of synthetic organic chemistry. Additional crosslinking agents that may also be successfully employed in a peelable layer comprising PVA include multivalent metal ion such as zinc, calcium, zirconium and titanium.

The peelable layer is typically applied at a dried coating thickness of 0.1 to 5 micrometers, preferably 0.25 to 1 micrometers. The peelable layer may be coated in a separate coating application or it may be applied simultaneously with one or more other layers.

As mentioned hereinabove, the optical film composites of the invention are particularly useful as protective cover sheets for polarizer plates employed in LCDs. Liquid Crystal Displays typically employ two polarizer plates, one on each side of the liquid crystal cell. Each polarizer plate, in turn, employs two cover sheets, one on each side of the PVA-dichroic film. Each cover sheet may comprise various auxiliary layers that are necessary to improve the performance of the LCD. Useful auxiliary layers employed in the cover sheets of the invention include: tie layer, abrasion resistant hardcoat layer, antiglare layer, anti-smudge layer or stain-resistant layer, antireflection layer, low reflection layer, antistatic layer, viewing angle compensation layer, and moisture barrier layer. Typically, the cover sheet closest to the viewer contains one or more of the following auxiliary layers: the abrasion resistant layer, anti-smudge or stain-resistant layer, antireflection layer, and antiglare layer. One or both of the cover sheets closest to the liquid crystal cell typically contain a viewing angle compensation layer. Any or all of the four cover sheets employed in the LCD may optionally contain one or more of a tie layer, an antistatic layer and a moisture barrier layer.

A tie layer is a distinct layer that is applied in a coating step either separate from or simultaneous with the application of other layers in the optical film. A tie layer strongly bonds to the two layers that are adjacent to it. Typically, a tie layer is used between the low birefringence polymer film and the peelable layer to prevent adhesion failure occurring between these layers during the manufacturing operation, peeling of the optical film, or during use of the optical film in the Liquid Crystal Display. The tie layer typically comprises one or more polymer binder and optionally, one or more crosslinking agents. The crosslinking agents are selected to react with functional groups present in the tie layer binder polymer and function groups present in polymers contained in the adjacent layers. In a preferred embodiment of the present invention in which an optical film comprises, in order, a TAC film, a tie layer, and a peelable layer comprising PVA, preferred tie layer compositions are disclosed in commonly-assigned, U.S. patent application Ser. No. 10/994,711, filed Nov. 22, 2004 which is incorporated herein by reference.

The optical film composite of the invention may contain an abrasion resistant layer on the same side of the carrier substrate as the low birefringence polymer film. Preferably, the abrasion resistant layer is located on the side of the low birefringence polymer film opposite to the carrier.

Particularly effective abrasion resistant layers for use in the present invention comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer of this invention and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the abrasion layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

Among others, in the present invention, conveniently used radiation curable lacquers include urethane (meth)acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6. Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968® from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio) phenyl]-2-morpholinopropanone-1.

The abrasion resistant layer is typically applied after coating and drying the low birefringence polymer film. The abrasion resistant layer of this invention is applied as a coating composition that typically also includes organic solvents. Preferably the concentration of organic solvent is 1-99% by weight of the total coating composition.

Examples of solvents employable for coating the abrasion resistant layer of this invention include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion of the abrasion resistant layer can be improved while minimizing migration of plasticizers and other addenda from the low birefringence polymer film, enabling the hardness of the abrasion resistant layer to be maintained. Suitable solvents for TAC low birefringence polymer film are aromatic hydrocarbon and ester solvents such as toluene and propyl acetate.

The UV polymerizable monomers and oligomers are coated and dried, and subsequently exposed to UV radiation to form an optically clear cross-linked abrasion resistant layer. The preferred UV cure dosage is between 50 and 1000 mJ/cm$^2$.

The thickness of the abrasion resistant layer is generally about 0.5 to 50 micrometers preferably 1 to 20 micrometers, more preferably 2 to 10 micrometers.

The abrasion resistant layer is preferably colorless, but it is specifically contemplated that this layer can have some color for the purposes of color correction, or for special effects, so long as it does not detrimentally affect the formation or viewing of the display through the overcoat. Thus, there can be incorporated into the polymer dyes that will impart color. In addition, additives can be incorporated into the polymer that will give to the layer desired properties. Other additional compounds may be added to the coating composition, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like. The abrasion resistant layer of the invention typically provides a layer having a pencil hardness (using the Standard Test Method for Hardness by Pencil Test ASTM D3363) of at least 2H and preferably 2H to 8H.

The optical film composite of the invention may contain an antiglare layer, a low reflection layer or an antireflection layer on the same side of the carrier substrate as the low birefringence polymer film. Preferably, the antiglare layer, low reflection layer or antireflection layer is located on the side of the low birefringence polymer film opposite to the carrier. Such layers are employed in an LCD in order to improve the viewing characteristics of the display, particularly when it is viewed in bright ambient light. The refractive index of an abrasion resistant, hard coat is about 1.50, while the index of the surrounding air is 1.00. This difference in refractive index produces a reflection from the surface of about 4%.

An antiglare coating provides a roughened or textured surface that is used to reduce specular reflection. All of the unwanted reflected light is still present, but it is scattered rather than specularly reflected. For the purpose of the present invention, the antiglare coating preferably comprises a radiation cured composition that has a textured or roughened surface obtained by the addition of organic or inorganic (matting) particles or by embossing the surface. The radiation cured compositions described hereinabove for the abrasion resistant layer are also effectively employed in the antiglare layer. Surface roughness is preferably obtained by the addition of matting particles to the radiation cured composition. Suitable particles include inorganic compounds having an oxide, nitride, sulfide or halide of a metal, metal oxides being particularly preferred. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are suitable, and Mg, Ca, B and Si are more preferable. An inorganic compound containing two types of metal may also be used. A particularly preferable inorganic compound is silicon dioxide, namely silica. Additional particles suitable for use in the antiglare layer of the present invention include the layered clays described in commonly-assigned U.S. patent application Ser. No. 10/690,123, filed Oct. 21, 2003. Other particles for use in the antiglare layer of the present invention include polymer matte particles or beads which are well known in the art. The polymer particles may be solid or porous, preferably they are crosslinked polymer particles. Porous polymer particles for use in an antiglare layer are described in commonly-assigned U.S. patent application Ser. No. 10/715,706, filed Nov. 18, 2003.

Particles for use in the antiglare layer have an average particle size ranging from 2 to 20 micrometers, preferably from 2 to 15 micrometers and most preferably from 4 to 10 micrometers. They are present in the layer in an amount of at least 2 wt percent and less than 50 percent, typically from about 2 to 40 wt. percent, preferably from 2 to 20 percent and most preferably from 2 to 10 percent.

The thickness of the antiglare layer is generally about 0.5 to 50 micrometers preferably 1 to 20 micrometers more preferably 2 to 10 micrometers. Preferably, the antiglare layer used in the present invention has a 60° Gloss value, according to ASTM D523, of less than 100, preferably less than 90 and a transmission haze value, according to ASTM D-1003 and JIS K-7105 methods, of less than 50%, preferably less than 30%.

In another embodiment of the present invention, a low reflection layer or antireflection layer is used in combination with an abrasion resistant hard coat layer or antiglare layer. The low reflection or antireflection coating is applied on top of the abrasion resistant or antiglare layer. Typically, a low reflection layer provides an average specular reflectance (as measured by a spectrophotometer and averaged over the wavelength range of 450 to 650 nm) of less than 2%. Antireflection layers provide average specular reflectance values of less than 1%.

Suitable low reflection layers for use in the present invention comprise fluorine-containing homopolymers or copolymers having a refractive index of less than 1.48, preferably with a refractive index between about 1.35 and 1.40. Suitable fluorine-containing homopolymers and copolymers include: fluoro-olefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid, and completely or partially fluorinated vinyl ethers, and the like. The effectiveness of the layer may be improved by the incorporation of submicron-sized inorganic particles or polymer particles that induce interstitial air voids within the coating. This technique is further described in U.S. Pat. No. 6,210,858 and U.S. Pat. No. 5,919,555. Further improvement of the effectiveness of the low reflection layer may be realized with the restriction of air voids to the internal particle space of submicron-sized polymer particles with reduced coating haze penalty, as described in commonly-assigned U.S. patent application Ser. No. 10/715,655, filed Nov. 18, 2003. The thickness of the low reflection layer is 0.01 to 1 micrometer and preferably 0.05 to 0.2 micrometer.

An antireflection layer may comprise a monolayer or a multi-layer. Antireflection layers comprising a monolayer typically provide reflectance values less than 1% at only a single wavelength (within the broader range of 450 to 650 nm). A commonly employed monolayer antireflection coating that is suitable for use in the present invention comprises a layer of a metal fluoride such as magnesium fluoride ($MgF_2$). The layer may be applied by well-known vacuum deposition technique or by a sol-gel technique. Typically, such a layer has an optical thickness (i.e., the product of refractive index of the layer times layer thickness) of approximately one quarter-wavelength at the wavelength where a reflectance minimum is desired.

Although a monolayer can effectively reduce the reflection of light within a very narrow wavelength range, more often a multi-layer comprising several (typically, metal oxide based) transparent layers superimposed on one another is used to reduce reflection over a wide wavelength region (i.e., broadband reflection control). For such a structure, half wavelength layers are alternated with quarter wavelength layers to improve performance. The multi-layer antireflection coating may comprise two, three, four, or even more layers. Formation of this multi-layer typically requires a complicated process comprising a number of vapor deposition procedures or sol-gel coatings, which correspond to the number of layers, each layer having a predetermined refractive index and thickness. Precise control of the thickness of each layer is required for these interference layers. The design of suitable multilayer antireflection coatings for use in the present invention is well known in the patent art and technical literature, as well as being described in various textbooks, for example, in H. A. Macleod, "Thin Film Optical Filters," Adam Hilger, Ltd., Bristol 1985 and James D. Rancourt, "Optical Thin Films User's Handbook", Macmillan Publishing Company, 1987.

The optical film composite of the invention may contain a moisture barrier layer on the same side of the carrier substrate as the low birefringence polymer film. The barrier layer may be located on one or both sides of the low birefringence polymer film. The moisture barrier layer comprises a hydrophobic polymer such as a vinylidene chloride polymer, vinylidene fluoride polymer, polyurethane, polyolefin, fluorinated polyolefin, polycarbonate, and others, having a low moisture permeability. Preferably, the hydrophobic polymer comprises vinylidene chloride. More preferably, the hydrophobic polymer comprises 70 to 99 weight percent of vinylidene chloride. The moisture barrier layer may be applied by application of an organic solvent-based or aqueous coating formulation. To provide effective moisture barrier properties the layer should be at least 1 micrometer in thickness, preferably from 1 to 10 micrometers in thickness, and most preferably from 2 to 8 micrometers in thickness. The cover sheet of the invention comprising a moisture barrier layer has a moisture vapor transmission rate (MVTR) according to ASTM F-1249 that is less than 1000 g/m$^2$ day, preferably less than 800 g/m$^2$/day and most preferably less than 500 g/m$^2$/day. The use of such a barrier layer in the cover sheet of the invention provides improved resistance to changes in humidity and increased durability of the polarizer comprising the cover sheet, especially for TAC cover sheets having a thickness less than about 40 micrometers.

The optical film composite of the invention may contain a transparent antistatic layer on the same side of the carrier substrate as the low birefringence polymer film. The antistatic layer may be located on either side of the low birefringence polymer film. The antistatic layer aids in the control of static charging that may occur during the manufacture and use of the cover sheet composite. Effective control of static charging reduces the propensity for the attraction of dirt and dust to the cover sheet composite. The optical film composite of the invention may be particularly prone to triboelectric charging during the peeling of the cover sheet from the carrier substrate. The so-called "separation charge" that results from the separation of the cover sheet and the substrate can be effectively controlled by an antistatic layer having a resistivity of less than about $1\times10^{11}$ Ω/square, preferably less than $1\times10^{10}$ Ω/square, and most preferably less than $1\times10^9$ Ω/square.

Various polymeric binders and conductive materials may be employed in the antistatic layer. Polymeric binders useful in the antistatic layer include any of the polymers commonly used in the coating art, for example, interpolymers of ethylenically unsaturated monomers, cellulose derivatives, polyurethanes, polyesters, hydrophilic colloids such as gelatin, polyvinyl alcohol, polyvinyl pyrrolidone, and others.

Conductive materials employed in the antistatic layer may be either ionically-conductive or electronically-conductive. Ionically-conductive materials include simple inorganic salts, alkali metal salts of surfactants, polymeric electrolytes containing alkali metal salts, and colloidal metal oxide sols (stabilized by metal salts).

The antistatic layer employed in the current invention preferably contains an electronically-conductive material due to their humidity and temperature independent conductivity. Suitable materials include:
1) electronically-conductive metal-containing particles including donor-doped metal oxides, metal oxides containing oxygen deficiencies, and conductive nitrides, carbides, and bromides.
2) fibrous electronic conductive particles comprising, for example, antimony-doped tin oxide coated onto non-conductive potassium titanate whiskers as described in U.S. Pat. Nos. 4,845,369 and 5,166,666, antimony-doped tin oxide fibers or whiskers as described in U.S. Pat. Nos. 5,719,016 and 5,0731,119, and the silver-doped vanadium pentoxide fibers described in U.S. Pat. No. 4,203,769
3) electronically-conductive polyacetylenes, polythiophenes, and polypyrroles, preferably the polyethylene dioxythiophene described in U.S. Pat. No. 5,370,981 and commercially available from Bayer Corp. as Baytron® P.

The amount of the conductive agent used in the antistatic layer of the invention can vary widely depending on the conductive agent employed. For example, useful amounts range from about 0.5 mg/m$^2$ to about 1000 mg/m$^2$, preferably from about 1 mg/m$^2$ to about 500 mg/m$^2$. The antistatic layer has a thickness of from 0.05 to 5 micrometers, preferably from 0.1 to 0.5 micrometers to insure high transparency.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

Thus, one of the major factors measuring the quality of LCDs is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to employ a cover sheet having a viewing angle compensation layer (also referred to as a compensation layer, retarder layer, or phase difference layer), with proper optical properties, between the PVA-dichroic film and liquid crystal cell, such as disclosed in U.S. Pat. Nos. 5,583,679, 5,853,801, 5,619,352, 5,978,055, and 6,160,597. A compensation film according to U.S. Pat. Nos. 5,583,679 and 5,853,801 based on discotic liquid crystals which have negative birefringence, is widely used.

Viewing angle compensation layers useful in the present invention are optically anisotropic layers. The optically anisotropic, viewing angle compensation layers may comprise positively birefringent materials or negatively birefringent materials. The compensation layer may be optically uniaxial or optically biaxial. The compensation layer may have its optic axis tilted in the plane perpendicular to the layer. The tilt of the optic axis may be constant in the layer thickness direction or the tilt of the optic axis may vary in the layer thickness direction.

Optically anisotropic, viewing angle compensation layers useful in the present invention may comprise the negatively birefringent, discotic liquid crystals described in U.S. Pat. Nos. 5,583,679, and 5,853,801; the positively birefringent nematic liquid crystals described in U.S. Pat. No. 6,160,597; the negatively birefringent amorphous polymers described in commonly assigned U.S. Patent Application Publication 2004/0021814A and U.S. patent application Ser. No. 10/745,109, filed Dec. 23, 2003. These latter two patent applications describe compensation layers comprising polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone and that preferably have a glass transition temperature of greater than 180 degree C. Such polymers are particularly useful in the compensation layer of the present invention. Such polymers include polyesters, polycarbonates, polyimides, polyetherimides, and polythiophenes. Of these, particularly preferred polymers for use in the present invention include: (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene) bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing. A compensation layer comprising these polymers typically has an out-of-plane retardation, $R_{th}$, that is more negative than −20 nm, preferably $R_{th}$ is from −60 to −600 nm, and most preferably $R_{th}$ is from −150 to −500 nm. Another compensation layer suitable for the present invention includes an optically anisotropic layer comprising an exfoliated inorganic clay material in a polymeric binder as described in Japanese Patent Application 11095208A.

The auxiliary layers of the invention can be applied by any of a number of well known liquid coating techniques, such as dip coating, rod coating, blade coating, air knife coating, gravure coating, microgravure coating, reverse roll coating, slot coating, extrusion coating, slide coating, curtain coating, or by vacuum deposition techniques. In the case of liquid coating, the wet layer is generally dried by simple evaporation, which may be accelerated by known techniques such as convection heating. The auxiliary layer may be applied simultaneously with other layers such as subbing layers and the low birefringence polymer film. Several different auxiliary layers may be coated simultaneously using slide coating, for example, an antistatic layer may be coated simultaneously with a moisture barrier layer or a moisture barrier layer may be coated simultaneously with a viewing angle compensation layer. Known coating and drying methods are described in further detail in Research Disclosure 308119, Published December 1989, pages 1007 to 1008.

Figure 13:
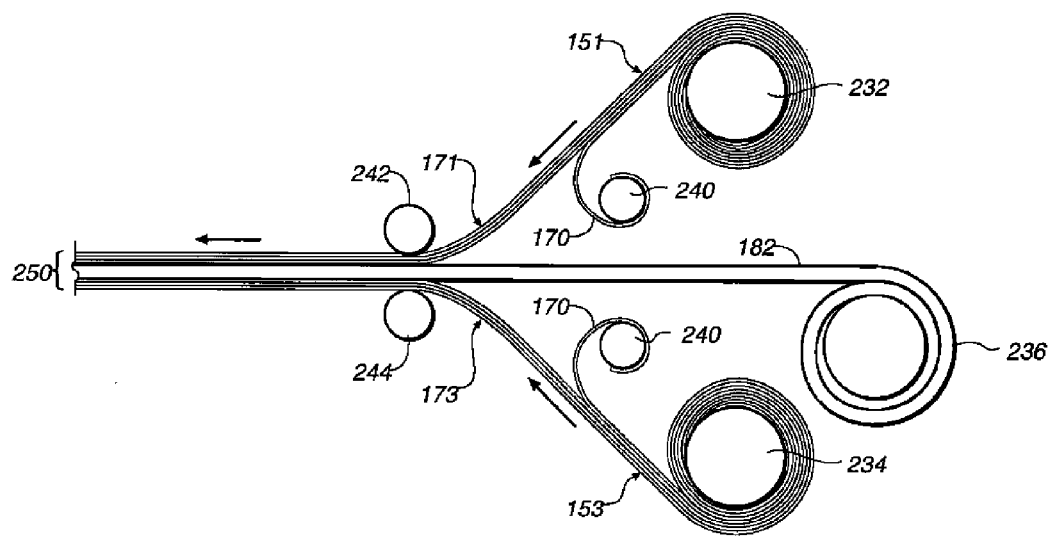
FIG. 13 shows a schematic of a method to fabricate a polarizer plate using the optical film composites of the invention.

Turning now to FIG. 13, a schematic representation of a method to fabricate a polarizer plate from optical film composites of the invention is illustrated. After removing the edge areas as described above in reference to FIGS. 8 through 12, optical film composite 151 (see FIG. 4) comprising cover sheet 171 and carrier substrate 170 and optical film composite 153 (see FIG. 5) comprising cover sheet 173 and carrier substrate 170 are supplied from supply rolls 232 and 234, respectively. A PVA-dichroic film 238 is supplied from supply roll 236. Prior to entering a lamination nip between opposing pinch rollers 242 and 244, the carrier substrate 170 is peeled from optical film composites 151 and 153 to expose a lowermost layer (in the case of FIGS. 4 and 5, this is layer 162, which for the purpose of example is a peelable layer comprising PVA). The peeled carrier sheet 170 is wound into rolls at take-up rolls 240. A glue solution may be optionally applied to both sides of the PVA-dichroic film or to the lowermost layer of cover sheets 171 and 173 prior to the sheets and film entering the nip between pinch rollers 232 and 234. Cover sheets 171 and 173 are then laminated to either side of PVA-dichroic film 238 with the application of pressure (and, optionally, heat) between the opposing pinch rollers 242 and 244 to give the polarizer plate 250. Polarizer plate 250 may then be dried by heating and wound into rolls until needed. Depending on the particular layer configuration for the optical film composites employed, a wide variety of polarizer plates having cover sheets with various combinations of auxiliary layers may be fabricated.

In accordance with the practice of the present invention, the cover sheet is laminated to the PVA dichroic film such that the peelable layer comprising PVA is on the side of the cover sheet that contacts the PVA dichroic film. The glue solution useful for laminating the cover sheet and the PVA dichroic film is not particularly limited, a commonly employed example is a water/alcohol solution containing a dissolved polymer such as PVA or its derivatives and a boron compound such as boric acid. Alternatively, the solution may be free or substantially free of dissolved polymer and comprise a reagent that crosslinks PVA. The reagent may crosslink PVA either ionically or covalently or a combination of both types of reagents may be used. Appropriate crosslinking ions include but are not limited to cations such as calcium, magnesium, barium, strontium, boron, beryllium, aluminum, iron, copper, cobalt, lead, silver, zirconium and zinc ions. Boron compounds such as boric acid and zirconium compounds such as zirconium nitrate or zirconium carbonate are particularly preferred. Examples of covalent crosslinking reagents include polycarboxylic acids or anhydrides; polyamines; epihalohydrins; diepoxides; dialdehydes; diols; carboxylic acid halides, ketenes and like compounds. The amount of the solution applied onto the films can vary widely depending on its composition. For example, a wet film coverage as low as 1 cc/m$^2$ and as high as 100 cc/m$^2$ are possible. Low wet film coverages are desirable to reduce the drying time needed.

Figure 14:
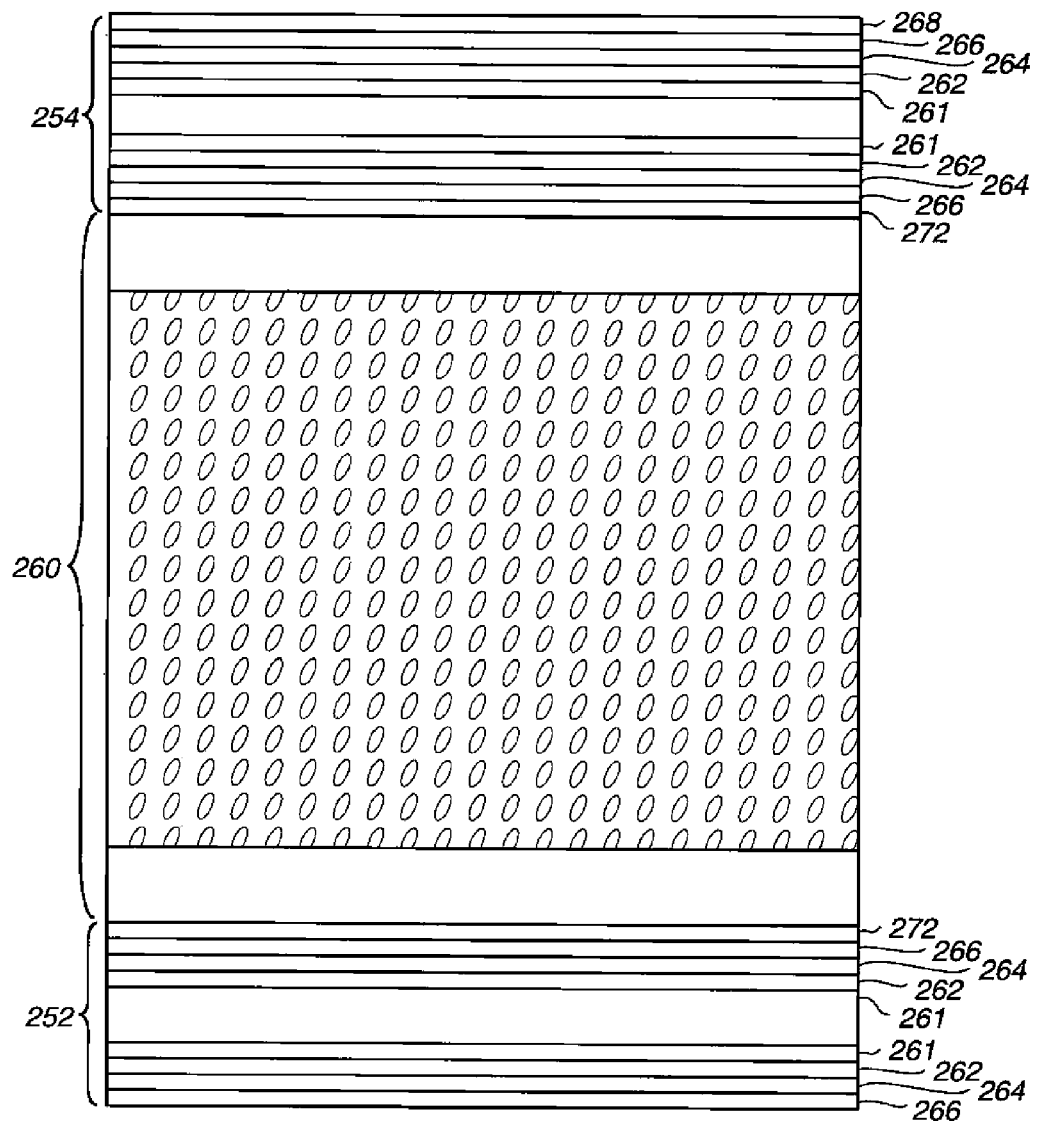
FIG. 14 shows a cross-sectional representation of a liquid crystal cell with polarizer plates on either side of the cell.

FIG. 14 presents a cross-sectional illustration showing a liquid crystal cell 260 having polarizer plates 252 and 254 disposed on either side. Polarizer plate 254 is on the side of the LCD cell closest to the viewer. Each polarizer plate employs two cover sheets. For the purpose of illustration, polarizer plate 254 is shown with an uppermost cover sheet (this is the cover sheet closest to the viewer) comprising a peelable layer comprising PVA 261, low birefringence polymer film 262, moisture barrier layer 264, antistatic layer 266, and antiglare layer 268. The lowermost cover sheet contained in polarizer plate 254 comprises a peelable layer comprising PVA 261, low birefringence polymer film 262, moisture barrier layer 264, antistatic layer 266, and viewing angle compensation layer 272. On the opposite side of the LCD cell, polarizer plate 252 is shown with an uppermost cover sheet, which for the purpose of illustration, comprises a peelable layer comprising PVA 261, low birefringence polymer film 262, moisture barrier layer 264, antistatic layer 266, and viewing angle compensation layer 272. Polarizer plate 252 also has a lowermost cover sheet comprising a peelable layer comprising PVA 261, low birefringence polymer film 262, moisture barrier layer 264, and antistatic layer 266.

The optical film composites of the invention are suitable for use with a wide variety of LCD display modes, for example, Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. Nos. 5,619,352 (Koch et al.), 5,410,422 (Bos), and 4,701,028 (Clerc et al.).

The following examples are intended to illustrate the present invention but not to limit it in scope in any way.

EXAMPLES

Example 1 (Comparative)

An optical film composite was produced in the following manner using a film coating machine having a film substrate unwinding station, a first coating station with an associated dryer, a corona discharge treatment unit, a second coating station and an associated dryer, and a film winding station:

A precursor substrate in the form of a roll of polyethylene terephthalate (PET) was placed in a coating machine unwinding station in preparation for being transported through the film coating machine. The roll of precursor substrate was 1,370 mm wide and approximately 2,750 meters in length. The precursor substrate was 99 micrometers in thickness. The face side of the precursor substrate was bare with no coatings. The backside of the precursor substrate has previously been coated with an antistatic material for reducing the tendency of the substrate to build static electric charges when the film substrate was manipulated.

The roll of precursor substrate was unwound and conveyed into the coating machine to a first coating station. At the first coating station, a peelable coating was applied to the front side of the substrate at a wet coverage of 32.3 g/m$^2$ and a width of 1,321 mm using a slot die coating applicator. The coating consists of a solution having the following composition:

| Component | Concentration, % by mass |
| --- | --- |
| Polyvinyl alcohol Celvol 205 supplied by Celanese Chemicals | 3.33 |
| Zirconium oxynitrate supplied by Bayer | 0.10 |
| Distilled Water | 85.85 |
| Methanol | 10.72 |

The coating applied in this fashion then passes into a dryer section where the solvent was removed from the coating. The temporary carrier substrate with the peelable layer having been coated and dried was then passed through a corona discharge treatment unit where it was exposed across its full width. The unit provides a dosage of 6.9 kJ/m$^2$.

The temporary carrier substrate with the peelable layer having been treated with the corona discharge then passes to a second coating station where an optical film coating of triacetyl cellulose was applied. For this application, a multi-layer slide bead applicator was used similar to the exemplary unit shown in FIG. 2. The applicator used has 5 slots, the first four of which are used for delivering functional polymer layers. The fifth slot was used in transient operations to provide a solvent flush used for preparing the applicator for coating and for cleaning the applicator slide surface at the end of the coating process. The coating width for this application was 1,308 mm.

In the first slot, a coating solution consisting of the following components was delivered at wet coverage of 13.3 g/m$^2$:

| Component | Concentration, % by mass |
| --- | --- |
| Carboset 525 supplied by Noveon (binder) | 8.0 |
| Trimethyl Borate (crosslinker) | 0.4 |
| Methylene Chloride (solvent) | 82.4 |
| Methanol (solvent) | 9.2 |

In the second slot, a coating solution consisting of the following components was delivered at a wet coverage of 95.1 g/m$^2$:

| Component | Concentration, % by mass |
| --- | --- |
| Triacetyl Cellulose CA-436-80S supplied by Eastman Chemicals (binder) | 6.50 |
| Dihexyl-1,2-cyclohexanedicarboxylate (plasticizer) | 0.65 |
| Tinuvin ® 8515 supplied by Ciba (UV absorber) | 0.23 |
| Parsol ® 1789 supplied by Roche (UV absorber) | 0.02 |
| Surflon S8405 (a fluorocarbon surfactant supplied by Seimi Chemical Company) | 0.05 |
| Methylene Chloride (solvent) | 83.25 |
| Methanol (solvent) | 9.25 |
| Ethyl Acetate (solvent) | 0.05 |

In the third slot, a coating solution consisting of the following was delivered at a wet coverage of 95.1 g/m$^2$:

| Component | Concentration, % by mass |
| --- | --- |
| Triacetyl Cellulose CA-436-80S supplied by Eastman Chemicals (binder) | 6.50 |
| Dihexyl-1,2-cyclohexanedicarboxylate (plasticizer) | 0.65 |
| Tinuvin ® 8515 supplied by Ciba (UV absorber) | 0.23 |
| Parsol ® 1789 supplied by Roche (UV absorber) | 0.02 |
| Surflon ® S8405 (a fluorocarbon surfactant supplied by Seimi Chemical Company) | 0.05 |
| Methylene Chloride (solvent) | 83.25 |
| Methanol (solvent) | 9.25 |
| Ethyl Acetate (solvent) | 0.05 |

In the fourth slot, a coating solution consisting of the following components was delivered at a wet coverage of 53.4 g/m$^2$:

| Component | Concentration, % by mass |
| --- | --- |
| Triacetyl Cellulose CA-436-80S supplied by Eastman Chemicals (binder) | 4.00 |
| Dihexyl-1,2-cyclohexanedicarboxylate (plasticizer) | 0.40 |
| Surflon ® S8405 (a fluorocarbon surfactant supplied by Seimi Chemical Company) | 0.20 |
| Methylene Chloride (solvent) | 85.68 |

-continued

| Component | Concentration, % by mass |
|---|---|
| Methanol (solvent) | 9.52 |
| Ethyl Acetate (solvent) | 0.20 |

The coated substrate then passes into a second dryer where the coating solvent was removed. After exiting the dryer, the optical film composite was wound into a roll at a winding station.

The adhesive strength of the optical film to the carrier substrate across the entire width of the optical film composite was found to be 0.6 N/m. The adhesive strength of the coated samples was measured in Newtons per meter (N/m) using a modified 45° peel test with an Imass 2000 Tester with a 100 gram load cell. First, 0.0254 m (one inch) wide strips of the coated sample were prepared. Delamination of the optical film at one end was initiated using a piece of 3M Magic Tape. An additional piece of tape was then attached to the delaminated part of the optical film and served as the gripping point for testing. The extending tape was long enough to extend beyond the support such that the tester grip did not interfere with the testing. The sample was then mounted into the Imass 2000 Tester with the substrate held in place on a vacuum block and the optical film/tape assembly clamped in the grip. The average force (in units of Newtons) required to peel the optical film off the carrier substrate at a 45° angle at speed of 12 inches/min (304 mm/min) was recorded. Using this force value the adhesive strength in units of N/m was calculated using the equation:

$$S_A = F_p (1-\cos\theta)/w$$

wherein $S_A$ is the adhesive strength, $F_p$ is the peel force, $\theta$ is the angle of peel (45°), and w is the width of the sample (0.0254 m).

Example 2 (Invention)

A second optical film composite was produced in a manner similar to Example 1 with the exception that the peelable layer was coated at a width of 1,283 mm. The corona discharge treatment applied across the full width of the peelable layer and temporary carrier substrate was 5.2 kJ/m². As in the case of the optical film composite in Example 1, the width of the triacetyl cellulose optical film coating was 1,308 mm, thus creating an edge area in the case of Example 2 that was 12.5 mm wide on each lateral edge of the carrier substrate. These edge areas, taken together, constitute 1.8% of the area of the carrier substrate. The adhesive strength of the optical film to the carrier substrate in the center area of the optical film composite was found to be 0.6 N/m. The adhesive strength of the optical film to the carrier substrate in the edge area of the optical film composite was found to be greater than 20 times the adhesive strength in the center area.

The method used to produce the optical film composite of Example 1 yields no edge area of increased adhesion strength given the relative dimensions of the polyvinyl alcohol peelable layer and the triacetyl cellulose layer. In this case, the peelable layer was 1,321 mm in width and extends beyond the edges of the triacetyl cellulose layer that was coated at 1,308 mm. This allows for no increased adhesion in the edge areas because the peelable layer prevents the corona discharge treatment from affecting the surface of the temporary carrier substrate and also prevents the triacetyl cellulose optical film from coming in contact with the treated carrier film substrate. The optical film was found to prematurely delaminate in the drying section after the second coating station.

In the case of the optical film composite of Example 2, the peelable layer was narrower than the triacetyl cellulose optical film. In this case, the peelable layer does not prevent the corona discharge unit from treating the temporary carrier substrate in the edge area. When the triacetyl cellulose layer was coated, it comes in direct contact with the corona discharge treated carrier substrate. This produces an edge area of increased adhesive strength. This film composite was transported though the coating machine without incident of premature delamination. The composite formed was then slit such that the edge area with high adhesive strength was removed. Using peeling and lamination machines, two units of the composite are peeled such that the triacetyl cellulose layer was removed from the carrier substrate and laminated to each side of a polyvinyl alcohol dichroic film to form a polarizer.

The invention has been described in detail with particular reference to certain preferred embodiments thereof, but it will be understood that variations and modifications can be effected within the spirit and scope of the invention.

PARTS LIST 10 drying system
12 moving substrate/web
14 dryer
16 coating apparatus
18 unwinding station
20 back-up roller
22 coated substrate
24 optical film composite
26 wind up station
28 coating supply vessel
30 coating supply vessel
32 coating supply vessel
34 coating supply vessel
36 pumps
38 pumps
40 pumps
42 pumps
44 conduits
46 conduits
48 conduits
50 conduits
52 discharge device
54 polar charge assist device
66 drying section
68 drying section
70 drying section
72 drying section
74 drying section
76 drying section
78 drying section
80 drying section
82 drying section
92 front section
94 second section
96 third section
98 fourth section
100 back plate
102 inlet
104 metering slot
106 pump
108 lower most layer
110 inlet 112 2nd metering slot
114 pump
116 layer
118 inlet
120 metering slot
122 pump
124 form layer
126 inlet
128 metering slot
130 pump
132 layer
134 incline slide surface
136 coating lip
138 2nd incline slide surface
140 3rd incline slide surface
142 4th incline slide surface
144 back land surface
146 coating bead
151 optical film composite
153 optical film composite
159 optical film composite
162 lowermost layer
164 intermediate layer
165 intermediate layer
166 intermediate layer
168 uppermost layer
170 carrier substrate
171 optical film
173 optical film
179 optical film
174 lowermost layer
176 intermediate layer
178 intermediate layer
180 uppermost layer
182 carrier substrate
184 release layer
200 feed line
202 extrusion hopper
204 pressurized tank
206 pump
208 metal drum
210 drying section
212 drying oven
214 cast film
216 final drying section
218 final dried film
220 wind-up station
232 optical film composite supply roll
234 optical film composite supply roll
236 PVA-dichroic film supply roll
238 PVA-dichroic film
240 carrier substrate take-up roll
242 opposing pinch roll
244 opposing pinch roll
250 polarizer plate
252 polarizer plate
254 polarizer plate
260 LCD cell
261 peelable layer comprising PVA
262 low birefringence polymer film
264 moisture barrier layer
266 antistatic layer
268 antiglare layer
272 viewing angle compensation layer
310 carrier substrate
312 carrier substrate center area
314a carrier substrate leading end area
314b carrier substrate trailing end area
316 carrier substrate edge area
318 carrier substrate
320 optical film composite
322 precursor substrate
324 release layer
326 optical film
330 optical film composite
332 carrier substrate
334 peelable layer
336 low birefringence polymer film
338 optical film
340 optical film composite
344 subbing layer
346 optical film
348 carrier substrate
350 knurls
355 edge slitting location
360 optical film composite
370 optical film composite after edge removal

The invention claimed is:

1. An optical film composite comprising a temporary carrier substrate having a center area and an edge area, said substrate having coated thereon an optical film wherein the adhesive strength between the optical film and the substrate is greater at the edge area than at the center area of the substrate.

2. The optical film composite of claim 1 wherein the composite is in the form of a roll.

3. The optical film composite of claim 2 wherein the roll has a leading end area and a trailing end area and wherein the adhesive strength is also greater at the leading end area and the trailing end area than at the center area.

4. The optical film composite of claim 1 wherein the adhesive strength at the edge area is greater than the adhesive strength at the center area by a factor of at least 10.

5. The optical film composite of claim 1 wherein the adhesive strength at the edge area is greater than the adhesive strength at the center area by a factor of at least 50.

6. The optical film composite of claim 1 wherein the adhesive strength at the edge area is greater than the adhesive strength at the center area by a factor of at least 200.

7. The optical film composite of claim 1 wherein the varying adhesive strength is created by a surface energy treatment of the edge area of the substrate.

8. The optical film composite of claim 1 wherein the substrate comprises a release layer located adjacent to the optical film, said release layer covering substantially all of the center area of the substrate.

9. The optical film composite of claim 8 wherein the release layer comprises a silicone containing polymer.

10. The optical film composite of claim 1 wherein the optical film comprises a low birefringence polymer film.

11. The optical film composite of claim 10 wherein the low birefringence polymer film is from 5 to 30 microns thick.

12. The optical film composite of claim 1 wherein the optical film comprises a peelable layer located adjacent to the substrate, said peelable layer covering substantially all of the center area of the substrate.

13. The optical film composite of claim 12 wherein the peelable layer is an adhesive layer.

14. The optical film composite of claim 13 wherein the adhesive layer is polyvinyl alcohol.

15. The optical film composite of claim 1 wherein the optical film is a polarizer cover sheet.

16. The optical film composite of claim 1 wherein the optical film is triacetylcellulose, polycarbonate or a cyclic olefin polymer.

17. The optical film composite of claim 1 wherein the optical film further comprises a compensation layer or an abrasion resistant hard coat.

18. The optical film composite of claim 1 wherein the substrate is polyethyleneterephthalate.

19. The optical film composite of claim 1 wherein substrate comprises a subbing layer on the edge areas adjacent to the optical film.

20. The optical film composite of claim 19 wherein the subbing layer comprises vinylidene chloride.

21. The optical film composite of claim 1 wherein the edge area comprises at least two percent of the substrate area.

22. The optical film composite of claim 1 wherein the leading end and the trailing end are individually at least 5 meters in length.

23. The optical film of claim 1 wherein the optical film is coated on both sides of the substrate.

24. The optical film composite of claim 1 wherein the edge area of the substrate is chemically modified.

25. The optical film composite of claim 1 wherein the edge area of the substrate is roughened.

26. An optical film composite comprising a temporary carrier substrate having a center area and an edge area, said substrate having adhered to the center area and to the edge area an optical film, wherein the adhesive strength between the optical film and the substrate is greater at the edge area than at the center area of the substrate.

27. A method of manufacturing an optical film composite comprising a temporary carrier substrate having a center area and an edge area, and an optical film comprising a low birefringence polymer film, wherein the adhesive strength between the optical film and the substrate will be greater at the edge areas than at the center area of the substrate, said method comprising providing a precursor substrate; forming an edge area and a center area on the precursor substrate to provide a temporary carrier substrate wherein the center area has a different adhesive property than the edge area; and coating and drying at least an optical film composition comprising a low birefringence polymer on the substrate to form the optical film.

28. The method of manufacturing of claim 27 wherein the edge area of the precursor substrate is subjected to a surface energy treatment.

29. The method of manufacturing of claim 28 wherein the surface energy treatment is a corona discharge treatment.

30. The method of manufacturing of claim 28 wherein a release layer is coated on the center area of the precursor substrate to form the temporary carrier substrate.

31. The method of manufacturing of claim 27 wherein a peelable layer is applied to the center area of the substrate prior to coating the low birefringence polymer composition.

32. The method of manufacturing of claim 27 wherein a subbing layer is applied to the edge area of the precursor carrier substrate to form the temporary carrier substrate.

33. The method of manufacturing of claim 32 wherein the peelable layer is coated simultaneously with low birefringence polymer composition.

34. The method of manufacturing of claim 27 wherein the optical film composite is manufactured in the form of a roll.

35. The method of manufacturing of claim 34 comprising forming a leading end area and a trailing end area on said roll wherein the adhesive strength is greater on the leading end area and the trailing end area than on the center area.

36. The method of manufacturing of claim 27 wherein adhesive strength in the edge area is greater than the adhesive strength in the center area by a factor of at least 10.

37. The method of manufacturing of claim 27 wherein adhesive strength in the edge area is greater than the adhesive strength in the center area by a factor of at least 50.

38. The method of manufacturing of claim 27 wherein adhesive strength in the edge area is greater than the adhesive strength in the center area by a factor of at least 200.

39. The method of manufacturing of claim 27 further comprising slitting the edge area off of the optical film composite.

40. The method of manufacturing of claim 27 wherein the optical film composition comprises knurls in the center area.

41. The method of manufacturing of claim 27 wherein the optical film is a polarizer cover sheet.

42. The method of manufacturing of claim 27 wherein said method comprising providing a precursor substrate; forming an edge area and a center area on the precursor substrate on both side of the substrate to provide a temporary carrier substrate wherein the center area has a different adhesive property than the edge area; and coating and drying at least a low birefringence polymer composition on both sides of the substrate to form the optical film.

43. A method of providing an optical film comprising taking an optical film composite comprising a temporary carrier substrate and an optical film having a center area and an edge area wherein the adhesive strength between the optical film and the substrate will be greater at the edge areas than at the center area of the substrate; and removing the edge area.

\* \* \* \* \*